(12) United States Patent
Kuo

(10) Patent No.: US 11,490,448 B1
(45) Date of Patent: Nov. 1, 2022

(54) METHOD AND APPARATUS FOR RADIO BEARER CONFIGURATION TO SUPPORT UE-TO-NETWORK RELAYING IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/839,136

(22) Filed: Jun. 13, 2022

Related U.S. Application Data

(60) Provisional application No. 63/220,329, filed on Jul. 9, 2021.

(51) Int. Cl.
*H04W 76/10* (2018.01)
*H04W 76/27* (2018.01)
*H04W 40/22* (2009.01)

(52) U.S. Cl.
CPC ........... *H04W 76/27* (2018.02); *H04W 40/22* (2013.01); *H04W 76/10* (2018.02)

(58) Field of Classification Search
CPC ..... H04W 88/04; H04W 76/14; H04W 92/18; H04W 8/005; H04W 76/11; H04W 72/02; H04W 40/22; H04W 80/02; H04W 76/10; H04W 48/16; H04W 36/03; H04W 4/40; H04W 76/12; H04W 12/75; H04W 24/02; H04W 24/04; H04W 76/20; H04W 76/27
See application file for complete search history.

(56) References Cited

U.S. PATENT DOCUMENTS

| | | | |
|---|---|---|---|
| 2013/0244672 A1* | 9/2013 | Lin | H04W 76/10 455/450 |
| 2017/0111754 A1* | 4/2017 | Baghel | H04W 76/27 |
| 2018/0324842 A1* | 11/2018 | Gulati | H04W 76/14 |
| 2021/0289391 A1* | 9/2021 | Paladugu | H04W 28/24 |
| 2022/0095411 A1* | 3/2022 | Lin | H04W 80/02 |

FOREIGN PATENT DOCUMENTS

| | | |
|---|---|---|
| EP | 2538736 | 12/2017 |
| WO | 2021195867 | 10/2021 |

* cited by examiner

*Primary Examiner* — Daniel Lai
(74) *Attorney, Agent, or Firm* — Blue Capital Law Firm, P.C.

(57) ABSTRACT

A method and device are disclosed for radio bearer configuration to support User Equipment-to-Network (UE-to-Network) relaying from the perspective of a relay UE. In one embodiment, the relay UE establishes a PC5-Radio Resource Control (PC5-RRC) connection with a remote UE. The relay UE also transmits a RRC message to a network node to request a radio bearer configuration to support UE-to-Network relaying. Furthermore, the relay UE receives a RRC Reconfiguration message from the network node, wherein the RRC Reconfiguration message includes a Uu configuration for a Uu Radio Link Control (RLC) bearer associated with a signalling radio bearer (SRB). In addition, the relay UE receives a RRC Reconfiguration Complete message from the remote UE. The relay UE also transmits the RRC Reconfiguration Complete message on the Uu RLC bearer to the network node.

20 Claims, 23 Drawing Sheets

Table of a list of measurement results

| Index | Measurement Result |
|---|---|
| 1 | Serving cell ID1 and RSRP1 of Relay UE1 |
| 2 | Serving cell ID2 and RSRP2 of Relay UE1 |
| 3 | Serving cell ID3 and RSRP3 of Relay UE1 |
| 4 | Serving cell ID4 and RSRP4 of Relay UE1 |

FIG. 23

METHOD AND APPARATUS FOR RADIO BEARER CONFIGURATION TO SUPPORT UE-TO-NETWORK RELAYING IN A WIRELESS COMMUNICATION SYSTEM

CROSS-REFERENCE TO RELATED APPLICATIONS

The present Application claims the benefit of U.S. Provisional Patent Application Ser. No. 63/220,329 filed on Jul. 9, 2021, the entire disclosure of which is incorporated herein in its entirety by reference.

FIELD

This disclosure generally relates to wireless communication networks, and more particularly, to a method and apparatus for radio bearer configuration to support UE-to-Network relaying in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for radio bearer configuration to support User Equipment-to-Network (UE-to-Network) relaying from the perspective of a relay UE. In one embodiment, the relay UE establishes a PC5-Radio Resource Control (PC5-RRC) connection with a remote UE. The relay UE also transmits a RRC message to a network node to request a radio bearer configuration to support UE-to-Network relaying. Furthermore, the relay UE receives a RRC Reconfiguration message from the network node, wherein the RRC Reconfiguration message includes a Uu configuration for a Uu Radio Link Control (RLC) bearer associated with a signalling radio bearer (SRB). In addition, the relay UE receives a RRC Reconfiguration Complete message from the remote UE. The relay UE also transmits the RRC Reconfiguration Complete message on the Uu RLC bearer to the network node.

BRIEF DESCRIPTION OF THE DRAWINGS

FIG. 23 is a table according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.287 V16.2.0, "Architecture enhancements for 5G System (5GS) to support Vehicle-to-Everything (V2X) services (Release 16)"; TR 23.752 V1.0.0, "Study on system enhancement for Proximity based services (ProSe) in the 5G System (5GS) (Release 17)"; TS 23.304 V1.0.0, "Proximity based Services (ProSe) in the 5G System (5GS) (Release 17)"; TR 38.836 V16.3.1, "Study on NR sidelink relay (Release 17)"; and TS 38.331 V14.0.0, "NR; Radio Resource Control (RRC) protocol specification (Release 17)". The standards and documents listed above are hereby expressly incorporated by reference in their entirety.

Figure 1:
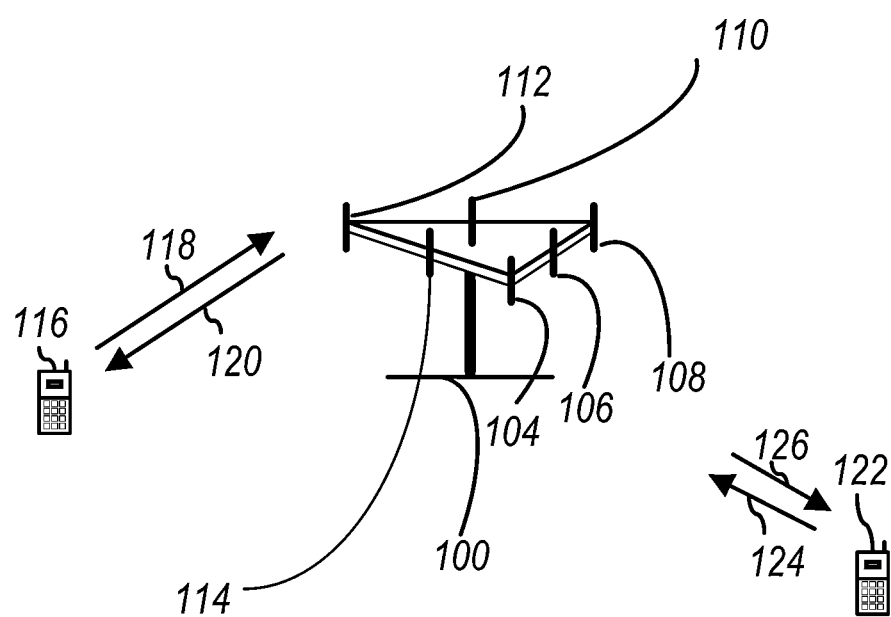
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
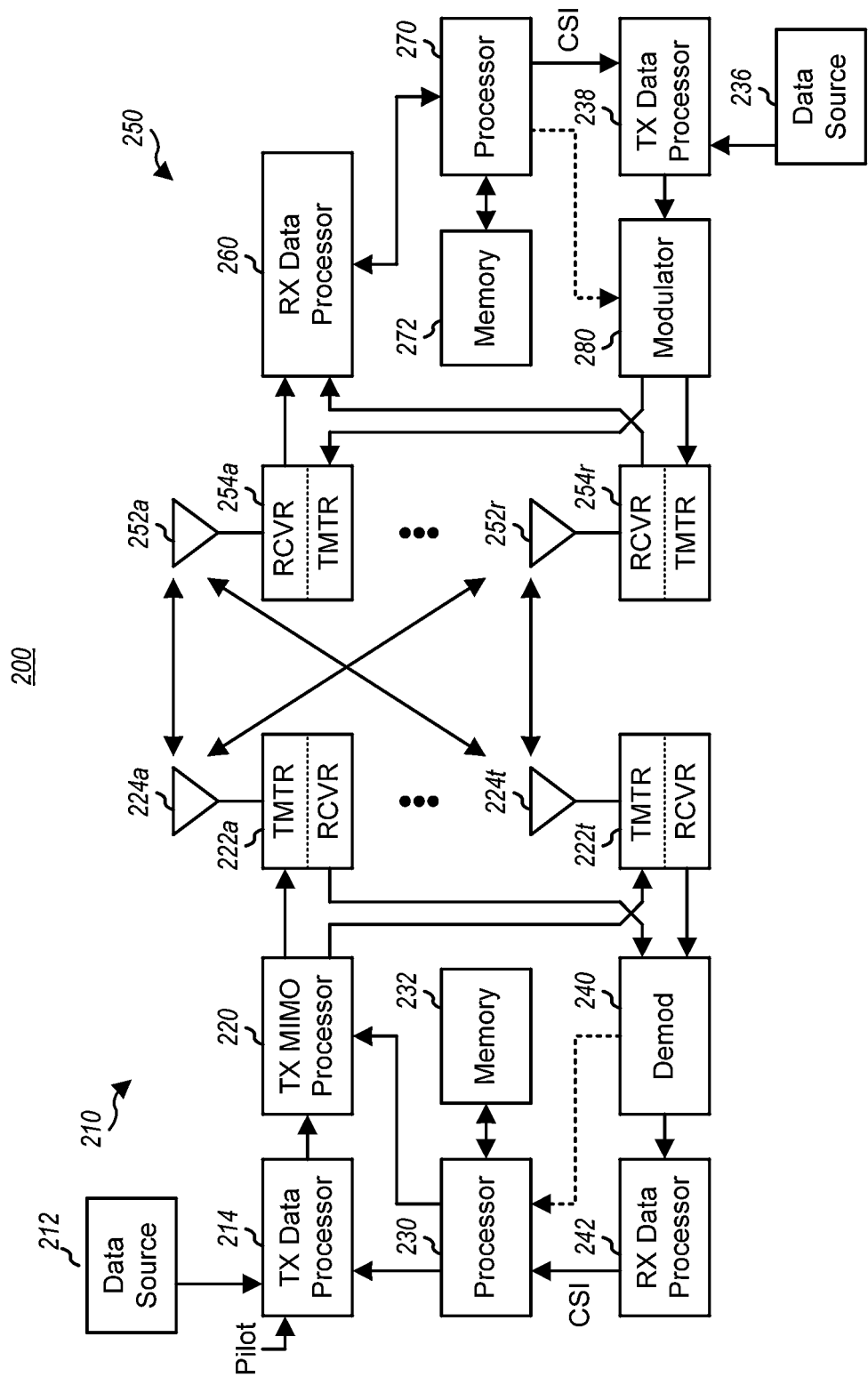
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
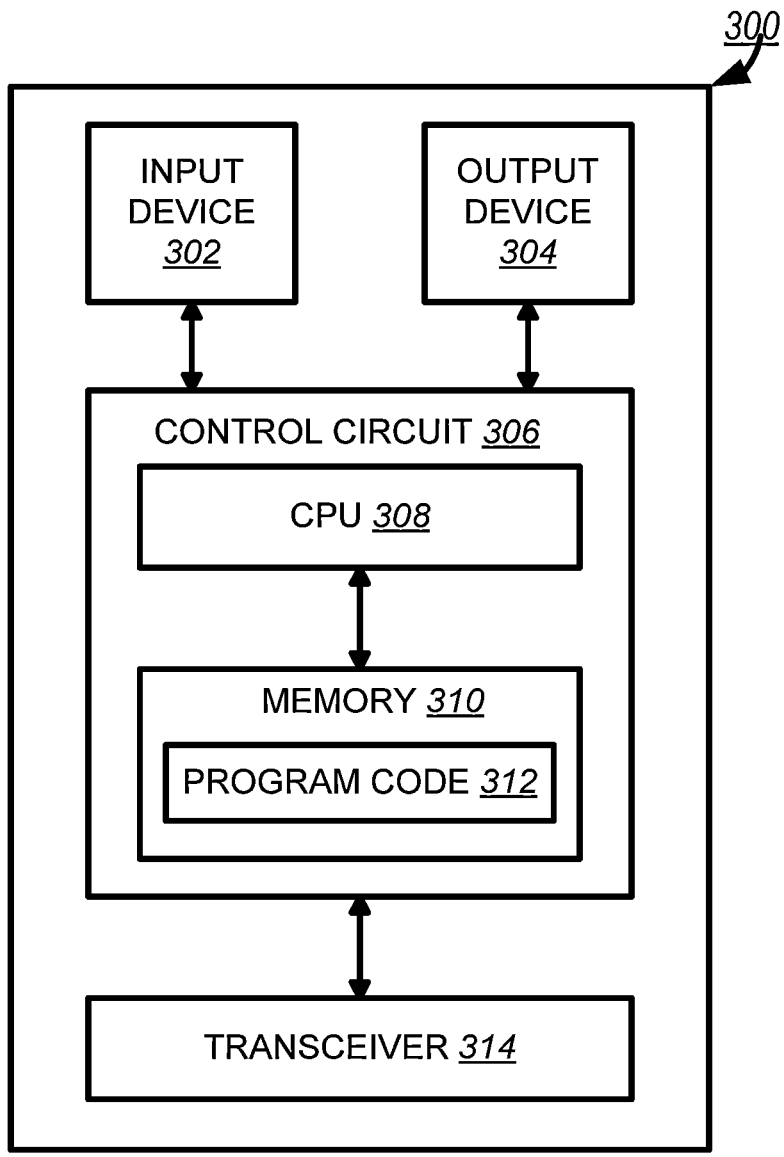
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
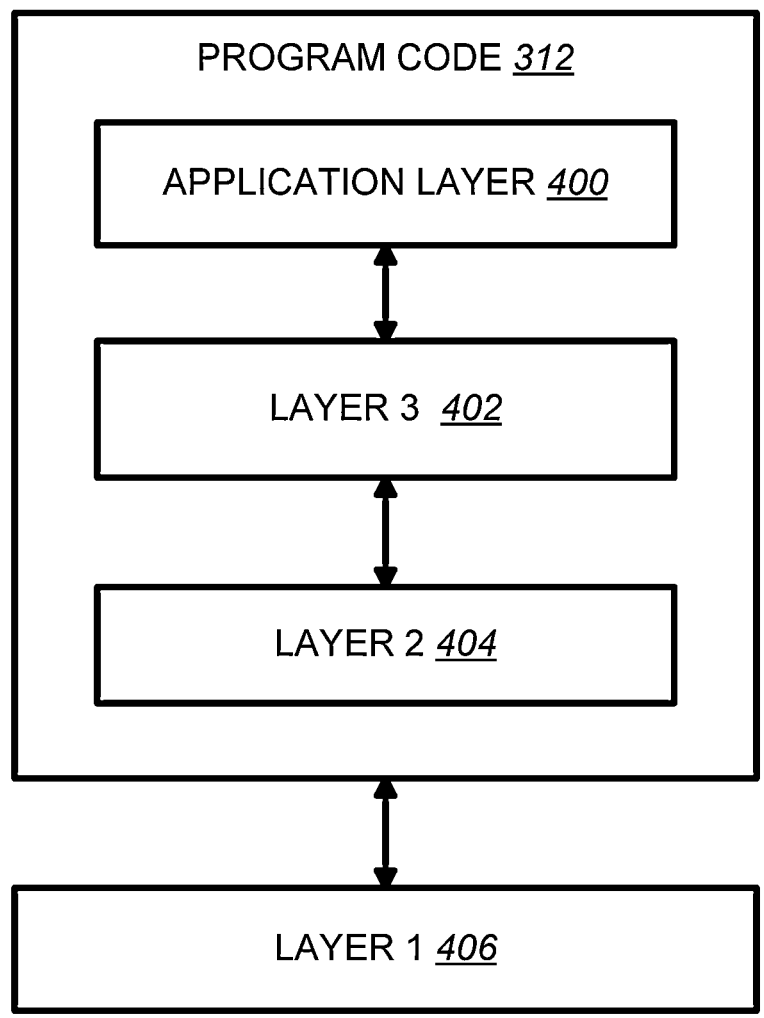
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 specifies identifiers for unicast mode Vehicle-to-Everything (V2X) communication and Layer-2 link establishment over PC5 reference point as below:

5.6.1.4 Identifiers for Unicast Mode V2X Communication Over PC5 Reference Point

For unicast mode of V2X communication over PC5 reference point, the destination Layer-2 ID used depends on the communication peer. The Layer-2 ID of the communication peer, identified by the Application Layer ID, may be discovered during the establishment of the PC5 unicast link, or known to the UE via prior V2X communications, e.g. existing or prior unicast link to the same Application Layer ID, or obtained from application layer service announcements. The initial signalling for the establishment of the PC5 unicast link may use the known Layer-2 ID of the communication peer, or a default destination Layer-2 ID associated with the V2X service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs. Based on privacy configuration as specified in clause 5.1.2.1, the update of the new identifiers of a source UE to the peer UE for the established unicast link may cause the peer UE to change its Layer-2 ID and optionally IP address/prefix if IP communication is used as defined in clause 6.3.3.2.

A UE may establish multiple PC5 unicast links with a peer UE and use the same or different source Layer-2 IDs for these PC5 unicast links. [ . . . ]

6.3.3.1 Layer-2 Link Establishment Over PC5 Reference Point

To perform unicast mode of V2X communication over PC5 reference point, the UE is configured with the related information as described in clause 5.1.2.1.

Figure 6:
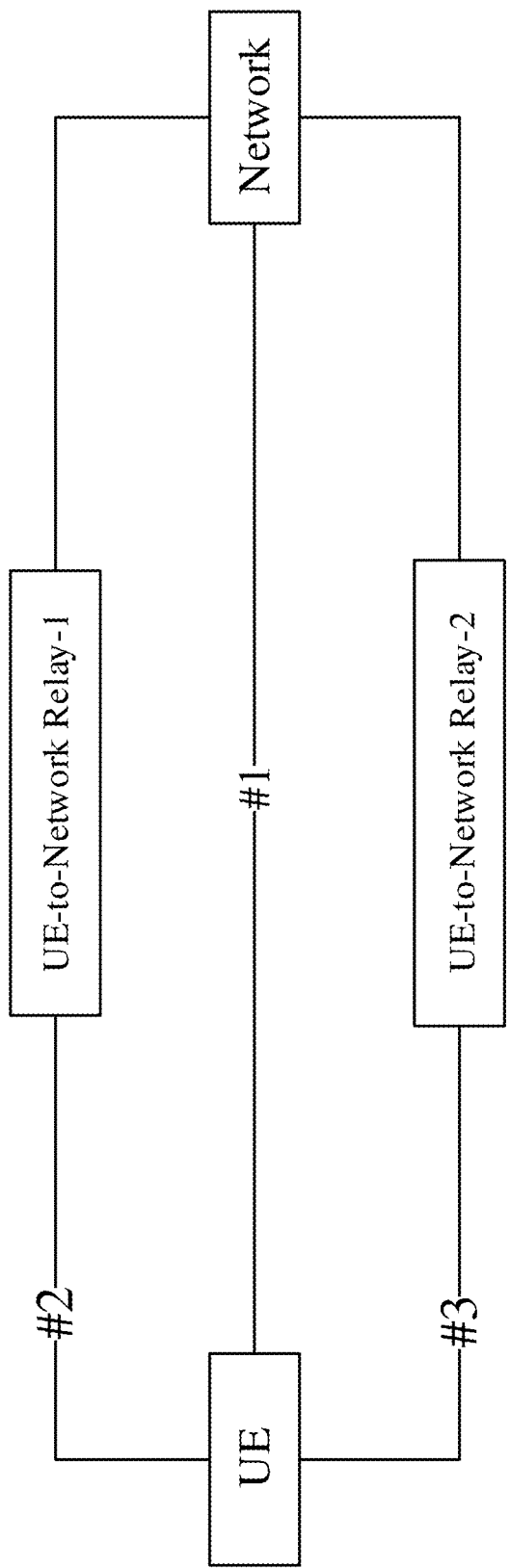
FIG. 6 is a reproduction of FIG. 5.3.1-1 of 3GPP TR 23.752 V17.0.0.

FIG. 6.3.3.1-1 shows the layer-2 link establishment procedure for unicast mode of V2X communication over PC5 reference point.

Figure 5:
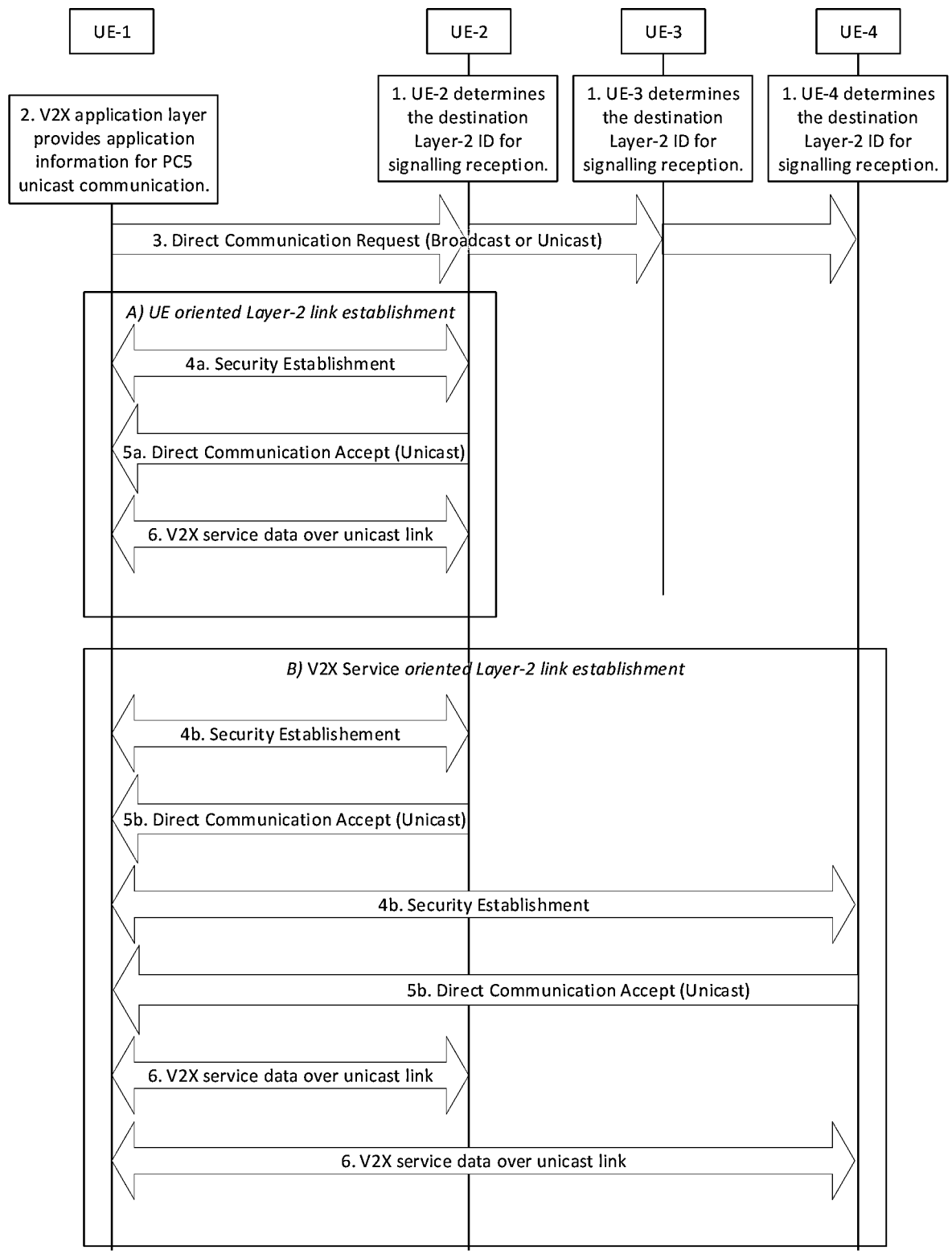
FIG. 5 is a reproduction of FIG. 6.3.3.1-1 of 3GPP TS 23.287 V16.2.0.

FIG. 6.3.3.1-1 of 3GPP TS 23.287 V16.2.0,
Entitled "Layer-2 Link Establishment Procedure",
is Reproduced as FIG. 5

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the V2X service type(s) (e.g. PSID(s) or ITS-AID(s)) of the V2X application and the initiating UE's Application Layer ID. The target UE's Application Layer ID may be included in the application information.
   The V2X application layer in UE-1 may provide V2X Application Requirements for this unicast communication. UE-1 determines the PC5 QoS parameters and PFI as specified in clause 5.4.1.4.
   If UE-1 decides to reuse the existing PC5 unicast link as specified in clause 5.2.1.4, the UE triggers Layer-2 link modification procedure as specified in clause 6.3.3.4.
3. UE-1 sends a Direct Communication Request message to initiate the unicast layer-2 link establishment procedure. The Direct Communication Request message includes:
   Source User Info: the initiating UE's Application Layer ID (i.e. UE-Vs Application Layer ID).
   If the V2X application layer provided the target UE's Application Layer ID in step 2, the following information is included:
     Target User Info: the target UE's Application Layer ID (i.e. UE-2's Application Layer ID).
   V2X Service Info: the information about V2X Service(s) requesting Layer-2 link establishment (e.g. PSID(s) or ITS-AID(s)).
   Security Information: the information for the establishment of security.
   NOTE 1: The Security Information and the necessary protection of the Source User Info and Target User Info are defined by SA WG3.
     The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"IPv6 Router" if IPv6 address allocation mechanism is supported by the initiating UE, i.e., acting as an IPv6 Router; or "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in FIG. 6.3.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).

If IP communication is used:

IP Address Configuration: For IP communication, IP address configuration is required for this link and indicates one of the following values:

"IPv6 Router" if IPv6 address allocation mechanism is supported by the target UE, i.e., acting as an IPv6 Router; or "IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. V2X service data is transmitted over the established unicast link as below:

The PC5 Link Identifier, and PFI are provided to the AS layer, together with the V2X service data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the V2X service data to UE-1 over the unicast link with UE-1.

3GPP TR 23.752 proposes to support UE-to-Network Relay for the following release (i.e. Release 17) as described below. Layer-2 and Layer-3 based UE-to-Network Relay solutions are described in 3GPP TR 23.752.

5.3 Key Issue #3: Support of UE-to-Network Relay 5.3.1 General Description

According to TS 22.261 [3] and TS 22.278 [2], support for UE-to-Network Relay needs to be studied. In addition, the Rel-16 5G architectural design (e.g. flow-based QoS communication over PC5/Uu interface) shall be taken into consideration as well.

The case that UE may be able to access to network via the direct network communication or the indirect network communication illustrated in FIG. 5.3.1-1 needs to be considered, where path #1 is direct network communication path that may not exist, as well as path #2 and path #3 are indirect network communication paths via different UE-to-Network Relays.

FIG. 5.3.1-1 of 3GPP TR 23.752 V17.0.0, Entitled "Example Scenario of Direct or Indirect Network Communication Path Between UE and Network", is Reproduced as FIG. 6

Therefore, 5G ProSe needs to support UE-to-Network Relay. In particular, the following aspects need to be studied:

How to authorize a UE to be a 5G UE-to-Network Relay and how to authorize a UE to access 5GC via a 5G UE-to-Network Relay.

How to establish a connection between Remote UE and a UE-to-Network Relay to support connectivity to the network for the Remote UE.

How to support end-to-end requirements between Remote UE and the network via a UE-to-Network Relay, including QoS (such as data rate, reliability, latency) and the handling of PDU Session related attributes (e.g. S-NSSAI, DNN, PDU Session Type and SSC mode).

How the network allows and controls the QoS requirement for 5G ProSe UE-to-NW relay.

How to transfer data between the Remote UE and the network over the UE-to-Network Relay.

NOTE 1: Security and privacy aspects will be handled by SA WG3.

How to (re)select a UE-to-Network Relay for communication path selection between two indirect network communication paths (i.e. path #2 and path #3 in FIG. 5.3.1-1).

How to perform communication path selection between a direct network communication path (i.e. path #1 in FIG. 5.3.1-1) and an indirect network communication path (i.e. path #2 or path #3 in FIG. 5.3.1-1).

How to guarantee service continuity during these communication path switch procedures for switching between a direct network communication path and an indirect communication path, as well as for switching between two indirect network communication paths.

NOTE 2: Support of non-unicast mode communication (i.e. one-to-many communication/broadcast or multicast) between network and UE-to-Network Relay UE and between UE-to-Network Relay and Remote UE(s) depends on the result of FS_5MBS work.

Two cases can be considered regarding support of UE-to-Network Relay, i.e. UE-to-Network Relay served by gNB as shown in FIG. 5.3.1-2 and UE-to-Network Relay served by ng-eNB as shown in FIG. 5.3.1-3.

Figure 7:
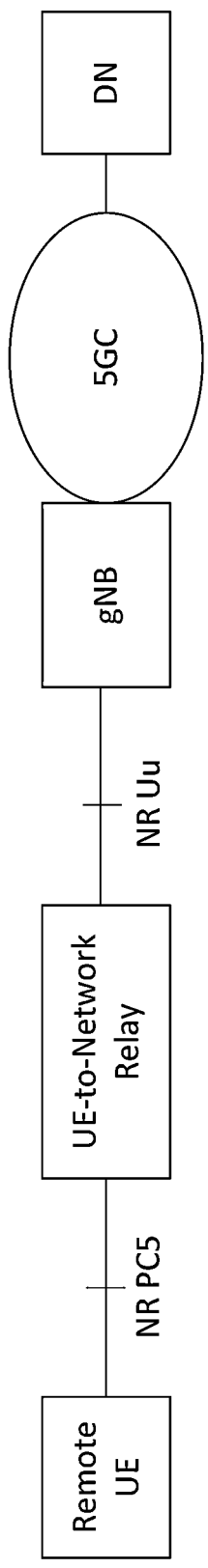
FIG. 7 is a reproduction of FIG. 5.3.1-2 of 3GPP TR 23.752 V17.0.0.

FIG. 5.3.1-2 of 3GPP TR 23.752 V17.0.0, Entitled "UE-to-Network Relay Served by gNB", is Reproduced as FIG. 7

Figure 8:
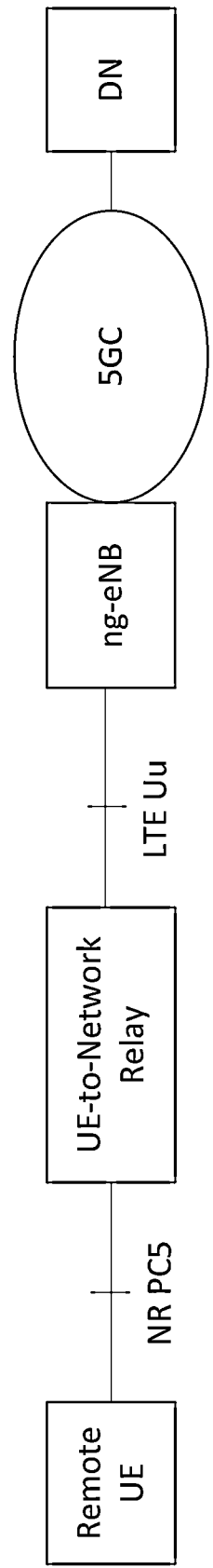
FIG. 8 is a reproduction of FIG. 5.3.1-3 of 3GPP TR 23.752 V17.0.0.

FIG. 5.3.1-3 of 3GPP TR 23.752 V17.0.0, Entitled "UE-to-Network Relay Served by Ng-eNB", is Reproduced as FIG. 8

NOTE 3: Whether to support the case that a UE-to-Network Relay is served by ng-eNB depends on solution to be identified in this study and RAN decision.

NOTE 4: When UE-to-Network Relay moves to E-UTRAN, LTE PC5 based ProSe UE-to-Network Relay can be supported as defined TS 23.303 [9] for Public Safety.

[ ... ]

3GPP TS 23.304 specifies Policy/Parameter provisioning for 5G ProSe UE-to-Network Relay and UE-to-Network Relay discovery as follows:

3 Definitions of Terms, Symbols and Abbreviations
3.1 Terms
[ ... ]

User Info ID: The User Info ID is configured for Model A or Model B Direct Discovery either for public safety or commercial applications based on the policy of the HPLMN or via the ProSe application server that allocates it. The User Info ID is sent by the announcing or discoverer or discoveree UE over the air. The definition of values of User Info ID is out of scope of this specification.

[ ... ]

5.1.4.1 Policy/Parameter Provisioning for 5G ProSe UE-to-Network Relay

The following information is provisioned in the UE in support of the UE assuming the role of a ProSe UE-to-Network Relay:

1) Authorisation policy for acting as a 5G ProSe Layer-3 and/or Layer-2 UE-to-Network Relay when "served by NG-RAN":
    PLMNs in which the UE is authorized to relay traffic for 5G ProSe Layer-3 and/or Layer-2 Remote UEs.

2) ProSe Relay Discovery policy/parameters for 5G ProSe UE-to-Network Relay:
    Includes the parameters that enable the UE to perform 5G ProSe Relay Discovery when provisioned from the PCF in the ME or configured in the UICC:
        5G ProSe UE-to-Network Relay Discovery parameters (User Info ID, Relay Service Code(s));
        Default Destination Layer-2 ID(s) for sending and receiving initial signaling of discovery messages;
        For Layer 3 ProSe UE-to-Network Relay, the PDU Session parameters (PDU Session type, DNN, SSC Mode, S-NSSAI, Access Type Preference) to be used for the relayed traffic for each ProSe Relay Service Code;
        Includes security related content for 5G ProSe Relay Discovery for each ProSe Relay Service Code.
    Editor's note: Whether the security parameters can be provided by the PCF and details of security parameters will be determined by SA3 WG.
    NOTE 1: 5G ProSe Relay Discovery policy/parameters can be provided from ProSe Application Server to the 5G ProSe UE-to-Network Relay.

3) For Layer 3 ProSe UE-to-Network Relay, QoS mapping(s):
    Each QoS mapping entry includes:
        a mapping between a 5QI value and a PQI value;
        a PQI PDB adjustment factor, for the PC5 communication for the UE-to-Network Relay operation;
        optional the Relay Service Code(s) associates with the QoS mapping entry.

4) For 5G ProSe Layer 3 UE-to-Network Relay to relay Ethernet or Unstructured traffic from Remote UE by using IP type PDU Session,
    Mapping of ProSe Service(s) to ProSe Application Server address information (consisting of IP address/FQDN and transport layer port number).

The following information is provisioned in the UE in support of the UE assuming the role of a Remote UE and thereby enabling the use of a ProSe UE-to-Network Relay:

1) Authorisation policy for using a 5G ProSe Layer-3 and/or Layer-2 UE-to-Network Relay:

Indicates whether the UE is authorised to use a 5G ProSe Layer-3 and/or Layer-2 UE-to-Network Relay.

2) Policy/parameters for 5G ProSe Relay Discovery:

Includes the parameters for 5G ProSe Relay Discovery and for enabling the UE to connect to the 5G ProSe UE-to-Network Relay after discovery when provisioned from the PCF in the ME or configured in the UICC:

ProSe UE-to-Network Relay Discovery parameters (User Info ID, Relay Service Code(s));

Default Destination Layer-2 ID(s) for sending and receiving initial signaling of discovery messages;

For 5G ProSe Layer 3 UE-to-Network Relay, the PDU Session parameters (PDU Session type, DNN, SSC Mode, S-NSSAI, Access Type Preference) to be used for the relayed traffic for each ProSe Relay Service Code;

Includes security related content for ProSe Relay Discovery for each ProSe Relay Service Codes.

Editor's note: Whether the security parameters can be provided by the PCF and details of security parameters will be determined by SA3 WG.

NOTE 2: ProSe Relay Discovery policy/parameters can be provided from ProSe Application Server to the Remote UE.

The following information is provisioned in the UE in support of the UE assuming the role of a 5G ProSe UE-to-Network Relay as well as in the UE in support of the UE assuming the role of a 5G ProSe Remote UE and thereby enabling the use of a 5G ProSe UE-to-Network Relay:

1) Radio parameters for 5G ProSe Relay Discovery when the UE is not "served by NG-RAN":

Includes the radio parameters NR PC5 with Geographical Area(s) and an indication of whether they are "operator managed" or "non-operator managed". The UE uses the radio parameters to perform 5G ProSe Direct Discovery over PC5 reference point when "not served by NG-RAN" only if the UE can reliably locate itself in the corresponding Geographical Area. Otherwise, the UE is not authorized to transmit.

2) Radio parameters for 5G ProSe Relay Communication when the UE is not "served by NG-RAN":

Includes the radio parameters NR PC5 with Geographical Area(s) and an indication of whether they are "operator managed" or "non-operator managed". The UE uses the radio parameters to perform 5G ProSe Direct Communication over PC5 reference point when "not served by NG-RAN" only if the UE can reliably locate itself in the corresponding Geographical Area. Otherwise, the UE is not authorized to transmit.

[ . . . ]

5.8.1.8 User Info ID

User Info ID (including Announcer Info, Discoverer Info, Target Info, Discoveree Info) is defined in clause 3.1. [ . . . ]

6.3.2.3 UE-to-Network Relay Discovery 6.3.2.3.1 General

UE-to-Network Relay Discovery is applicable to both Layer-3 and Layer-2 UE-to-Network relay discovery for public safety use and commercial services. To perform UE-to-Network Relay Discovery, the Remote UE and the UE-to-Network Relay are pre-configured or provisioned with the related information as described in clause 5.1.

In UE-to-Network Relay Discovery, the UEs use pre-configured or provisioned information for the relay discovery procedures as defined in clause 5.1.4.1.

The Relay Service Code (RSC) is used in the UE-to-Network Relay discovery, to indicate the connectivity service the UE-to-Network Relay provides to the Remote UE. The RSCs are configured on the UE-to-Network Relay and the Remote UE as defined in clause 5.1.4. The RSC can also indicate if the UE-to-Network Relay is a Layer-3 or Layer-2 UE-to-Network Relay. A UE-to-Network Relay supporting multiple RSCs can advertise the RSCs using multiple discovery messages, with one RSC per discovery message.

Additional information used for the UE-to-Network Relay (re)selection and connection maintenance can be advertised using a separate discovery messages of type "Relay Discovery Additional Information". This may include for example the related system information of the UE-to-Network Relay's serving cell, as defined in TS 38.300 [12].

Both Model A and Model B discovery are supported:

Model A uses a single discovery protocol message (Announcement).

Model B uses two discovery protocol messages (Solicitation and Response).

For Relay Discovery Additional Information, only Model A discovery is used.

6.3.2.3.2 Procedure for UE-to-Network Relay Discovery with Model A

Depicted in FIG. 6.3.2.3.2-1 is the procedure for UE-to-Network Discovery with Model A.

Figure 9:
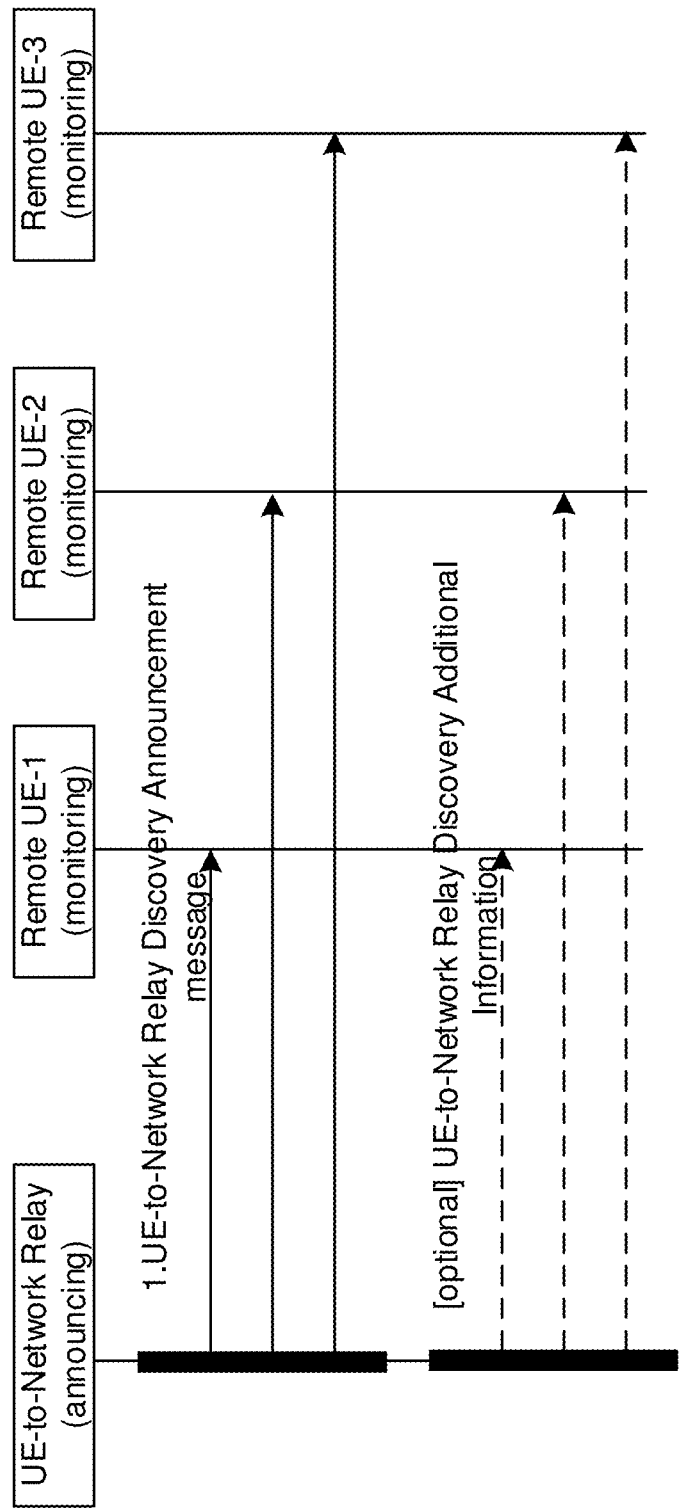
FIG. 9 is a reproduction of FIG. 6.3.2.3.2-1 of 3GPP TS 23.304 V1.0.0.

FIG. 6.3.2.3.2-1 of 3GPP TS 23.304 V1.0.0, Entitled "UE-to-Network Relay Discovery with Model A", is Reproduced as FIG. 9

1. The UE-to-Network Relay sends a UE-to-Network Relay Discovery Announcement message. The UE-to-Network Relay Discovery Announcement message contains Announcer Info and RSC, and is sent using the Source Layer-2 ID and Destination Layer-2 ID as described in clause 5.8.3.

For Layer-3 UE-to-Network Relay, the UE-to-Network Relay shall only include a RSC in the UE-to-Network Relay Discovery Announcement when the S-NSSAI associated with that RSC belongs to the Allowed NSSAI of the UE-to-Network Relay.

The Remote UE (1 to 3) determines the Destination Layer-2 ID for signalling reception. The Destination Layer-2 ID is configured with the UE(s) as specified in clause 5.1.4.1.

Remote UE (1 to 3) monitors announcement messages with the UE-to-Network RSC corresponding to the desired services.

Optionally, the ProSe UE-to-Network Relay may also send UE-to-Network Relay Discovery Additional Information messages. The parameters contained in this message are described in clause 5.8.3.

6.3.2.3.3 Procedure for UE-to-Network Relay Discovery with Model B

Depicted in FIG. 6.3.2.3.3-1 is the procedure for UE-to-Network Relay Discovery with Model B.

Figure 10:
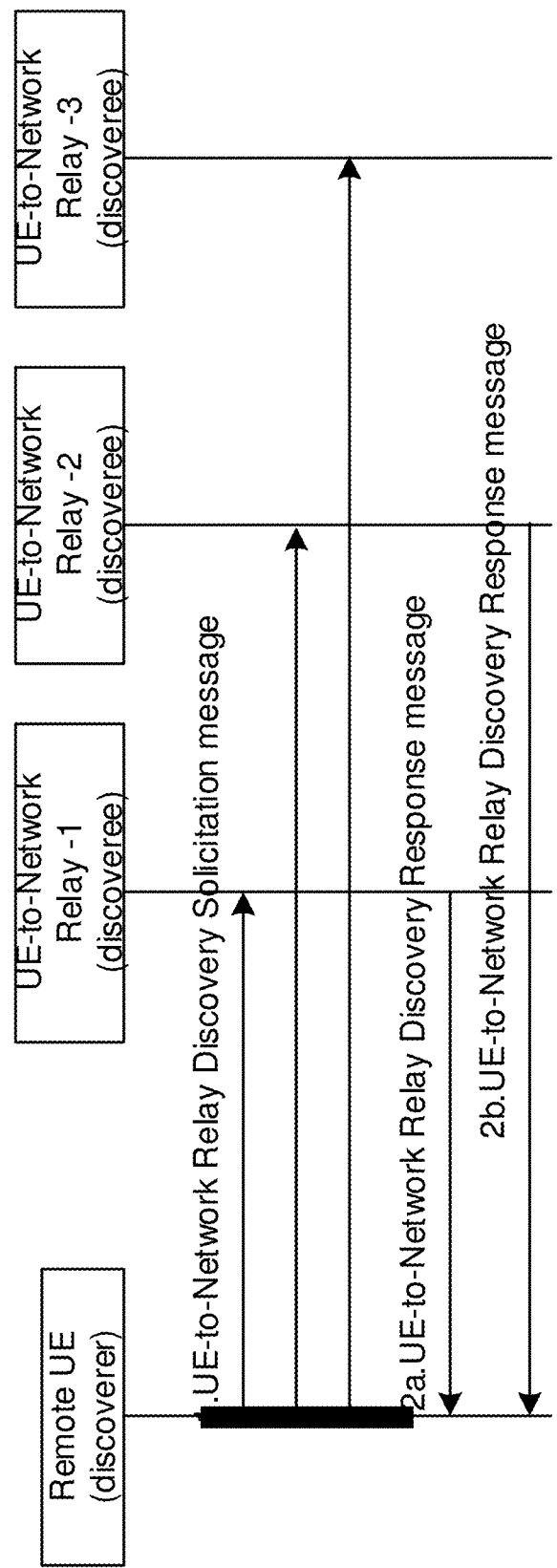
FIG. 10 is a reproduction of FIG. 6.3.2.3.3-1 of 3GPP TS 23.304 V1.0.0.

FIG. 6.3.2.3.3-1 of 3GPP TS 23.304 V1.0.0, Entitled "UE-to-Network Relay Discovery with Model B", is Reproduced as FIG. 10

1. The 5G ProSe Remote UE sends a 5G ProSe UE-to-Network Relay Discovery Solicitation message. The 5G ProSe UE-to-Network Discovery Solicitation message contains Discoverer Info and RSC, and is send using the Source Layer-2 ID and Destination Layer-2 ID as described in clause 5.8.3. The 5G ProSe Remote UE discovering a 5G ProSe UE-to-Network Relay sends a solicitation message with the RSC which is associated to the desired connectivity service.
   How the 5G ProSe UE-to-Network Relays (1 to 3) determine the Destination Layer-2 ID for signalling reception is specified in clause 5.8.3. The Destination Layer-2 ID is configured with the UE(s) as specified in clause 5.1.4.1.
2. The 5G ProSe UE-to-Network Relays (1 and 2) that match the values of the RSC contained in the solicitation message respond to the Remote UE with a UE-to-Network Relay Discovery Response message. The 5G ProSe UE-to-Network Relay Discovery Response message contains Discoveree Info and RSC, and is sent using the Source Layer-2 ID and Destination Layer-2 ID as described in clause 5.8.3.
   For 5G ProSe Layer-3 UE-to-Network Relay, the 5G ProSe UE-to-Network Relay shall only respond to a matching RSC in the UE-to-Network Relay Discovery Solicitation message when the S-NSSAI associated with that RSC belongs to the Allowed NSSAI of the 5G ProSe UE-to-Network Relay.

The 5G ProSe Remote UE selects the 5G ProSe UE-to-Network Relay based on the information received in step 2.
[ . . . ]
   3GPP TR 38.836 captures the current agreements on UE-to-Network Relay as follows:
4 Sidelink-Based UE-to-Network Relay
4.1 Scenarios, Assumptions and Requirements
The UE-to-Network Relay enables coverage extension and power saving for the Remote UE. The coverage scenarios considered in this study are the following:
   UE-to-Network Relay UE is in coverage and Remote UE is out of coverage
   UE-to-Network Relay UE and Remote UE are both in coverage
   For L3 UE-to-Network Relay, Relay UE and Remote UE can be in the same cell or different cells, after Remote UE establishes connection via Relay UE
   For L2 UE-to-Network Relay, it is supported as baseline that after Remote UE connects via Relay UE, Relay UE and Remote UE are controlled by the Relay UE's serving cell
For L2 UE-to-Network Relay, both cases below are supported, i.e.
   Before remote connection via Relay UE, Relay UE and Remote UE are in the same cell;
   Before remote connection via Relay UE, Relay UE and Remote UE are in different cells;
The considered scenarios are reflected in FIGS. 4.1-1.

Figure 11:
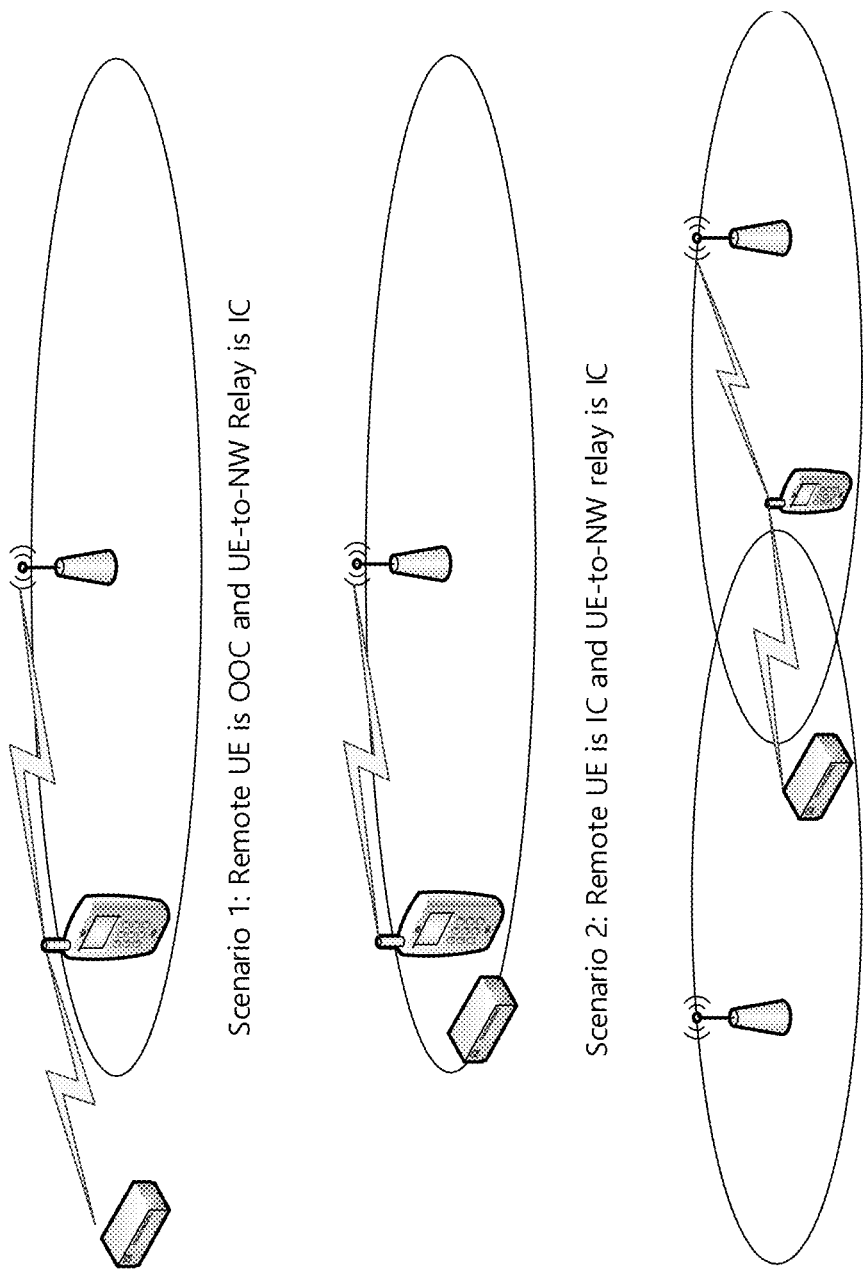
FIG. 11 is a reproduction of FIGS. 4.1-1 of 3GPP TR 38.836 V17.0.0.

FIGS. 4.1-1 of 3GPP TR 38.836 V17.0.0, Entitled "Scenarios for UE-to-Network Relay", is Reproduced as FIG. 11

NR Uu is assumed on the Uu link of the UE-to-Network Relay UE. NR sidelink is assumed on PC5 between the Remote UE(s) and the UE-to-Network Relay UE.

Cross-RAT configuration/control of UE (Remote UE or UE-to-Network Relay UE) is not considered, i.e., eNB/ng-eNB do not control/configure an NR Remote UE and UE-to-Network Relay UE. For UE-to-Network Relay, the study focuses on unicast data traffic between the Remote UE and the Network.

Configuring/scheduling of a UE (Remote UE or UE-to-Network Relay UE) by the SN to perform NR sidelink communication is out of scope of this study.

For UE-to-Network Relay, relaying of unicast data between the Remote UE and the network can occur after a PC5-RRC connection is established between the Relay UE and the Remote UE.

The Uu RRC state of the Relay UE and Remote UE can change when connected via PC5. Both Relay UE and Remote UE can perform relay discovery in any RRC state. A Remote UE can perform relay discovery while out of Uu coverage.

A Relay UE must be in RRC_CONNECTED to perform relaying of unicast data.

For L2 UE-to-Network Relay:
   Remote UE(s) must be in RRC CONNECTED to perform transmission/reception of relayed unicast data.
   The Relay UE can be in RRC_IDLE, RRC_INACTIVE or RRC_CONNECTED as long as all the PC5-connected Remote UE(s) are in RRC_IDLE.
   The Relay UE can be in RRC_INACTIVE or RRC_CONNECTED as long as all the PC5-connected Remote UE(s) are in RRC_INACTIVE.

For L3 UE-to-Network Relay, both Relay UE and Remote UE can be in RRC_INACTIVE state.

The requirement of service continuity is only for UE-to-Network Relay, but not for UE-to-UE Relay in this release.

RAN2 have studied the mobility scenario of "between direct (Uu) path and indirect (via the relay) path" for UE-to-Network relay. RAN2 focus on the mobility scenarios of intra-gNB cases in the study phase, and assume the inter-gNB cases will also be supported. For the inter-gNB cases, compared to the intra-gNB cases, potential different parts on Uu interface in details can be discussed in the WI phase.RAN2 deprioritize work specific to the mobility scenario of "between indirect (via a first Relay UE) and indirect (via a second Relay UE)" for path switching in the SI phase, which can be studied in the WI phase, if needed.

RAN2 deprioritize the group mobility scenario in the SI phase, which may be discussed in WI phase, if needed.

[ . . . ]

4.3 Relay (Re-)Selection Criterion and Procedure
The baseline solution for relay (re-)selection is as follow:
Radio measurements at PC5 interface are considered as part of relay (re)selection criteria.
   Remote UE at least use the radio signal strength measurements of sidelink discovery messages to evaluate whether PC5 link quality of a Relay UE satisfies relay selection and reselection criterion.
   When Remote UE is connected to a Relay UE, it may use SL-RSRP measurements on the sidelink unicast link to evaluate whether PC5 link quality with the Relay UE satisfies relay reselection criterion.

Further details on the PC5 radio measurements criteria, e.g., in case of no transmission on the sidelink unicast link can be discussed in WI phase. How to perform RSRP measurement based on RSRP of discovery message and/or SL-RSRP if Remote UE has PC5-RRC connection with Relay UE can be decided in WI phase.

For relay selection, as in LTE, an in-coverage Remote UE searches for a candidate Relay UE if direct Uu link quality of the Remote UE is below a configured threshold.

For relay (re-)selection, Remote UE compares the PC5 radio measurements of a Relay UE with the threshold which is configured by gNB or preconfigured. Higher layer criteria also need to be considered by Remote UE for relay (re-) selection, but details can be left to SA2 to decide. Relay (re-)selection can be triggered by upper layers of Remote UE.

Relay reselection should be triggered if the NR Sidelink signal strength of current Sidelink relay is below a (pre) configured threshold. Also, relay reselection may be triggered if RLF of PC5 link with current Relay UE is detected by Remote UE.

The above-described baseline for relay (re)selection apply to both L2 and L3 solutions. But for RRC_CONNECTED Remote UE connected through L2 UE-to-Network Relay scenario, gNB decision on relay selection/reselection is considered in WI phase under the above baseline. Additional AS layer criteria can be considered in WI phase for both L2 and L3 UE-to-Network Relay solutions.

For relay (re-)selection, when Remote UE has multiple suitable Relay UE candidates which meet all AS-layer & higher layer criteria and Remote UE need to select one Relay UE by itself, it is up to Remote UE implementation to choose one Relay UE. This does not exclude gNB involvement in service continuity for UE-to-Network Relay scenarios.

[ . . . ]

4.5 Layer-2 Relay 4.5.1 Architecture and Protocol Stack 4.5.1.1 Protocol Stack

The protocol stacks for the user plane and control plane of L2 UE-to-Network Relay architecture are described in FIG. 4.5.1.1-1 and FIG. 4.5.1.1-2 for the case where adaptation layer is not supported at the PC5 interface, and FIG. 4.5.1.1-3 and FIG. 4.5.1.1-4 for the case where adaptation layer is supported at the PC5 interface.

For L2 UE-to-Network Relay, the adaptation layer is placed over RLC sublayer for both CP and UP at the Uu interface between Relay UE and gNB. The Uu SDAP/PDCP and RRC are terminated between Remote UE and gNB, while RLC, MAC and PHY are terminated in each link (i.e. the link between Remote UE and UE-to-Network Relay UE and the link between UE-to-Network Relay UE and the gNB). Whether the adaptation layer is also supported at the PC5 interface between Remote UE and Relay UE is left to WI phase (assuming down-selection first before studying too much on the detailed PC5 adaptation layer functionalities).

Figure 12:
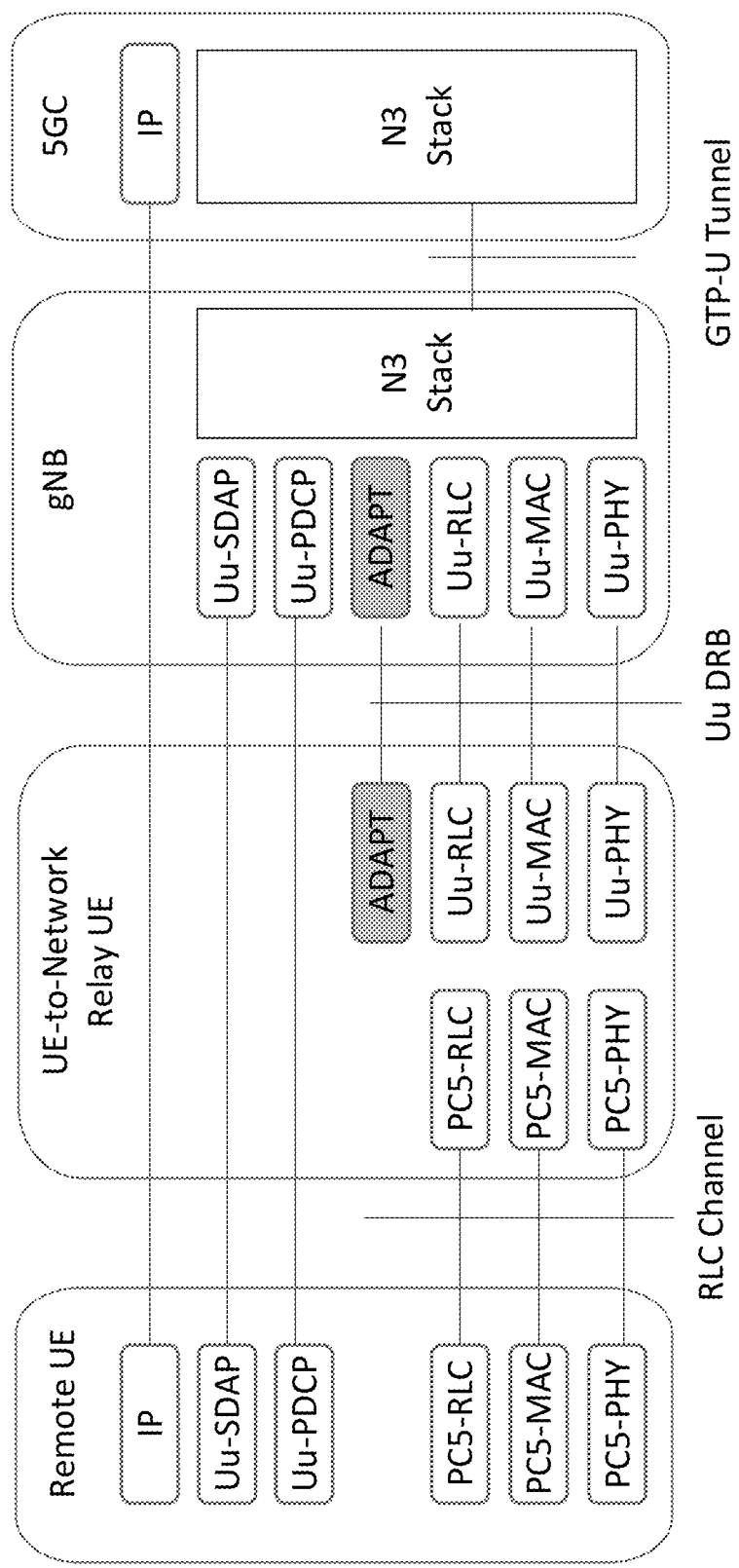
FIG. 12 is a reproduction of FIG. 4.5.1.1-1 of 3GPP TR 38.836 V17.0.0.

FIG. 4.5.1.1-1 of 3GPP TR 38.836 V17.0.0, Entitled "User Plane Protocol Stack for L2 UE-to-Network Relay (Adaptation Layer is not Supported at the PC5 Interface)", is Reproduced as FIG. 12

Figure 13:
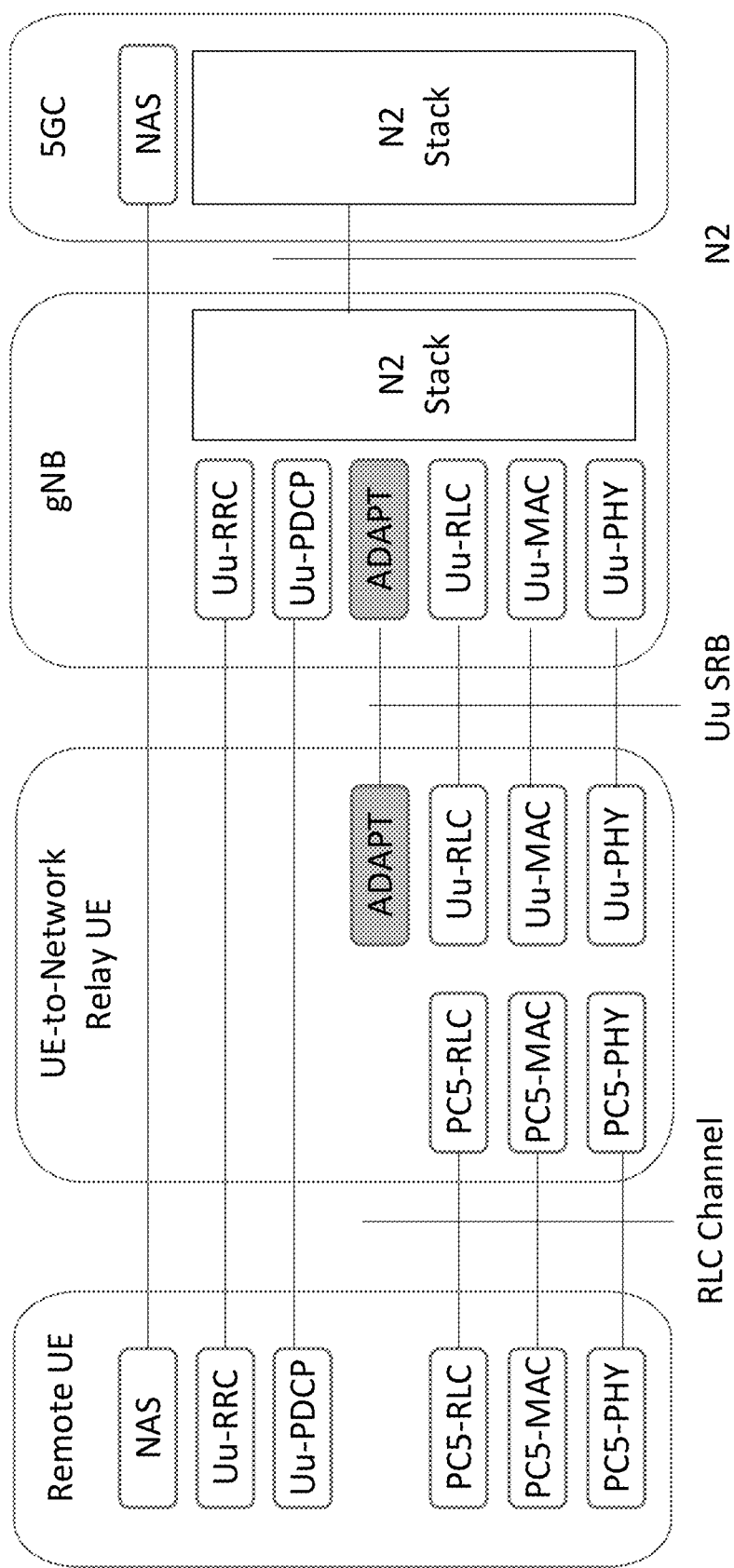
FIG. 13 is a reproduction of FIG. 4.5.1.1-2 of 3GPP TR 38.836 V17.0.0.

FIG. 4.5.1.1-2 of 3GPP TR 38.836 V17.0.0, Entitled "Control Plane Protocol Stack for L2 UE-to-Network Relay (Adaptation Layer is not Supported at the PC5 Interface)", is Reproduced as FIG. 13

Figure 14:
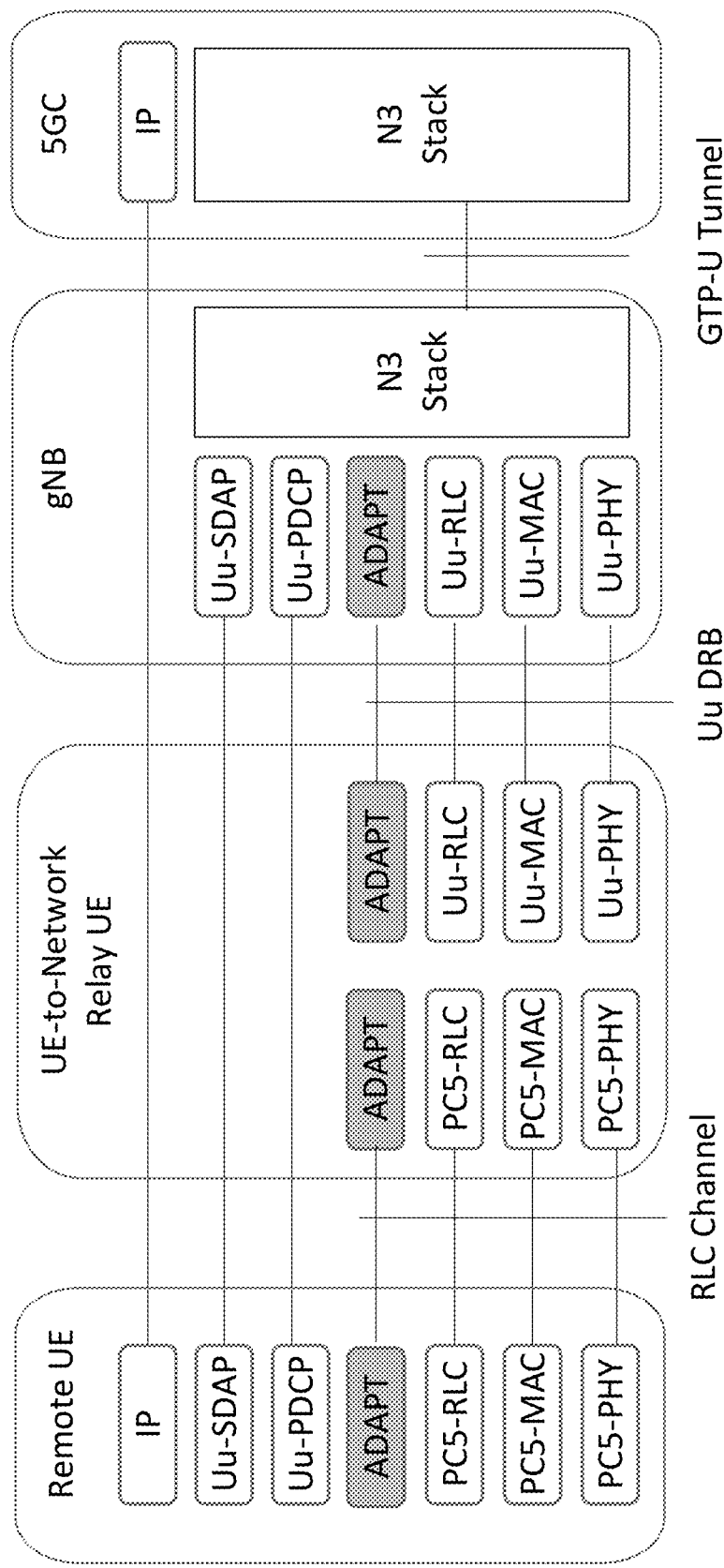
FIG. 14 is a reproduction of FIG. 4.5.1.1-3 of 3GPP TR 38.836 V17.0.0.

FIG. 4.5.1.1-3 of 3GPP TR 38.836 V17.0.0, Entitled "User Plane Protocol Stack for L2 UE-to-Network Relay (Adaptation Layer is Supported at the PC5 Interface)", is Reproduced as FIG. 14

Figure 15:
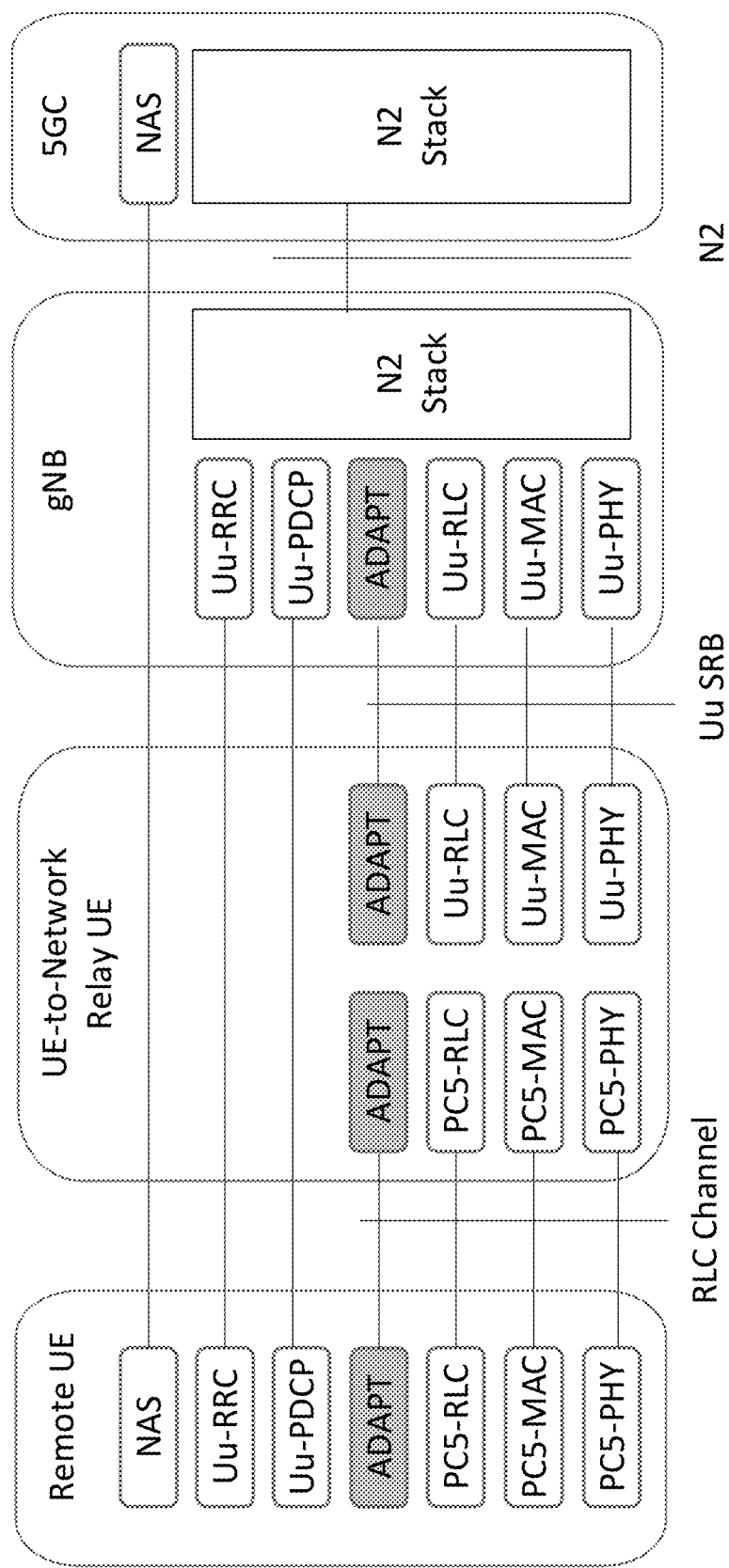
FIG. 15 is a reproduction of FIG. 4.5.1.1-4 of 3GPP TR 38.836 V17.0.0.

FIG. 4.5.1.1-4 of 3GPP TR 38.836 V17.0.0, Entitled "Control Plane Protocol Stack for L2 UE-to-Network Relay (Adaptation Layer is Supported at the PC5 Interface)", is Reproduced as FIG. 15

4.5.1.2 Adaptation Layer Functionality

For L2 UE-to-Network Relay, for uplink:
  The Uu adaptation layer at Relay UE supports UL bearer mapping between ingress PC5 RLC channels for relaying and egress Uu RLC channels over the Relay UE Uu path. For uplink relaying traffic, the different end-to-end RBs (SRB, DRB) of the same Remote UE and/or different Remote UEs can be subject to N:1 mapping and data multiplexing over one Uu RLC channel.
  The Uu adaptation layer is used to support Remote UE identification for the UL traffic (multiplexing the data coming from multiple Remote UE). The identity information of Remote UE Uu Radio Bearer and Remote UE is included in the Uu adaptation layer at UL in order for gNB to correlate the received data packets for the specific PDCP entity associated with the right Remote UE Uu Radio Bearer of a Remote UE.

For L2 UE-to-Network Relay, for downlink:
  The Uu adaptation layer can be used to support DL bearer mapping at gNB to map end-to-end Radio Bearer (SRB, DRB) of Remote UE into Uu RLC channel over Relay UE Uu path. The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu path.
  The Uu adaptation layer needs to support Remote UE identification for Downlink traffic. The identity information of Remote UE Uu Radio Bearer and the identity information of Remote UE needs be put into the Uu adaptation layer by gNB at DL in order for Relay UE to map the received data packets from Remote UE Uu Radio Bearer to its associated PC5 RLC channel.

4.5.2 QoS gNB implementation can handle the QoS breakdown over Uu and PC5 for the end-to-end QoS enforcement of a particular session established between Remote UE and network in case of L2 UE-to-Network Relay. Details of handling in case PC5 RLC channels with different end-to-end QoS are mapped to the same Uu RLC channel can be discussed in WI phase. [ . . . ]

4.5.4 Service Continuity
4.5.4.0 General

L2 UE-to-Network Relay uses the RAN2 principle of the Rel-15 NR handover procedure as the baseline AS layer solution to guarantee service continuity, i.e. gNB hands over the Remote UE to a target cell or target Relay UE, including:
1) Handover preparation type of procedure between gNB and Relay UE (if needed);
2) RRCReconfiguration to Remote UE, Remote UE switching to the target, and;
3) Handover complete message, similar to the legacy procedure.

Exact content of the messages (e.g. handover command) can be discussed in WI phase. This does not imply that we will send inter-node message over Uu.

Below, the common parts of intra-gNB cases and inter-gNB cases are captured. For the inter-gNB cases, compared to the intra-gNB cases, potential different parts on RAN2 Uu interface in details can be discussed in WI phase.

4.5.4.1 Switching from Indirect to Direct Path

For service continuity of L2 UE-to-Network relay, the following baseline procedure is used, in case of Remote UE switching to direct Uu cell.

Figure 16:
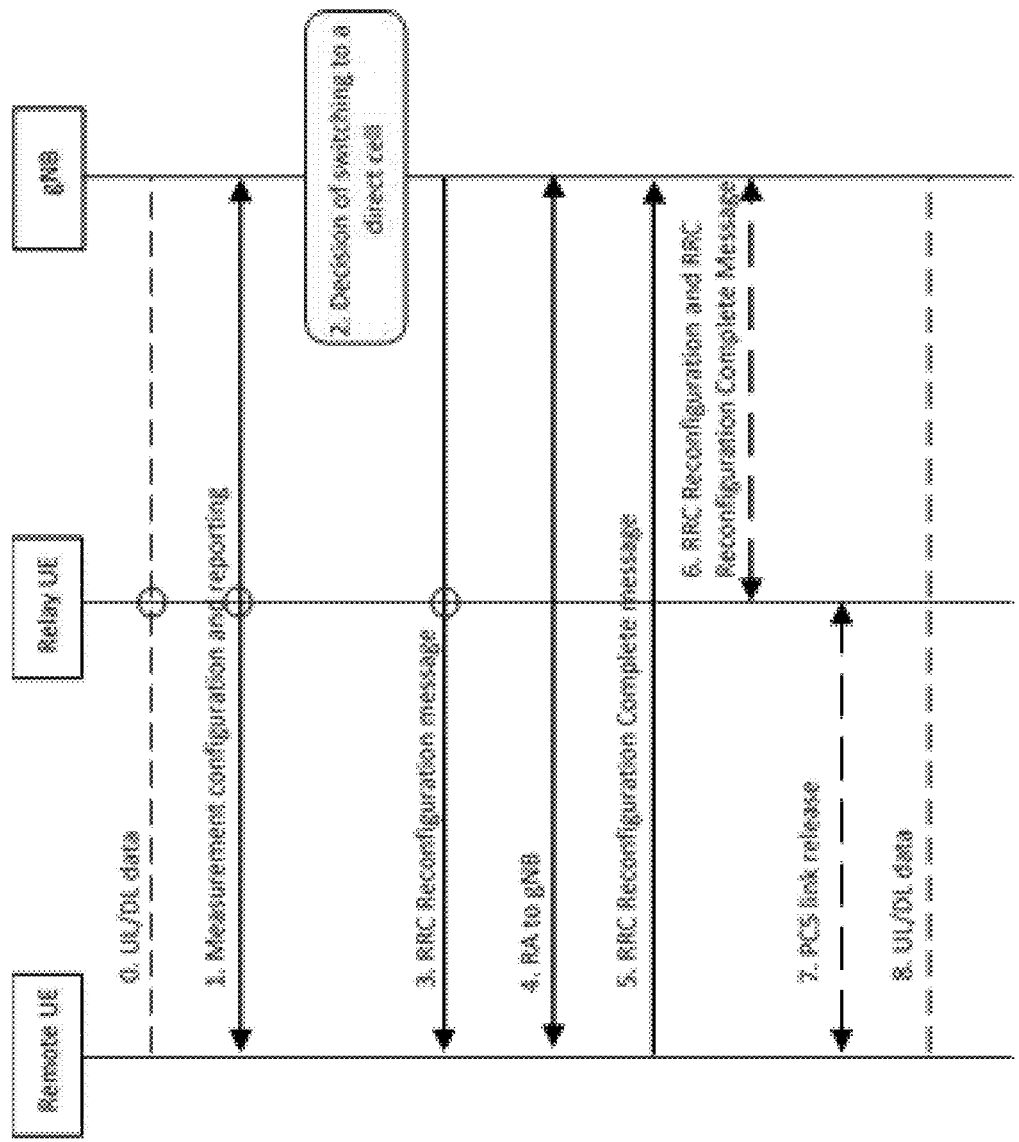
FIG. 16 is a reproduction of FIG. 4.5.4.1-1 of 3GPP TR 38.836 V17.0.0.

FIG. 4.5.4.1-1 of 3GPP TR 38.836 V17.0.0, Entitled "Procedure for Remote UE Switching to Direct Uu Cell", is Reproduced as FIG. 16

Step 1: Measurement configuration and reporting
Step 2: Decision of switching to a direct cell by gNB
Step 3: RRC Reconfiguration message to Remote UE
Step 4: Remote UE performs Random Access to the gNB
Step 5: Remote UE feedback the RRCReconfigurationComplete to gNB via target path, using the target configuration provided in the RRC Reconfiguration message.
Step 6: RRC Reconfiguration to Relay UE
Step 7: The PC5 link is released between Remote UE and the Relay UE, if needed.
Step 8: The data path switching.
 NOTE: The order of step 6/7/8 is not restricted. Following are further discussed in WI phase, including:
  Whether Remote UE suspends data transmission via relay link after step 3;
  Whether Step 6 can be before or after step 3 and its necessity;
  Whether Step 7 can be after step 3 or step 5, and its necessity/replaced by PC5 reconfiguration;
  Whether Step 8 can be after step 5.

4.5.4.2 Switching from Direct to Indirect Path

Figure 17:
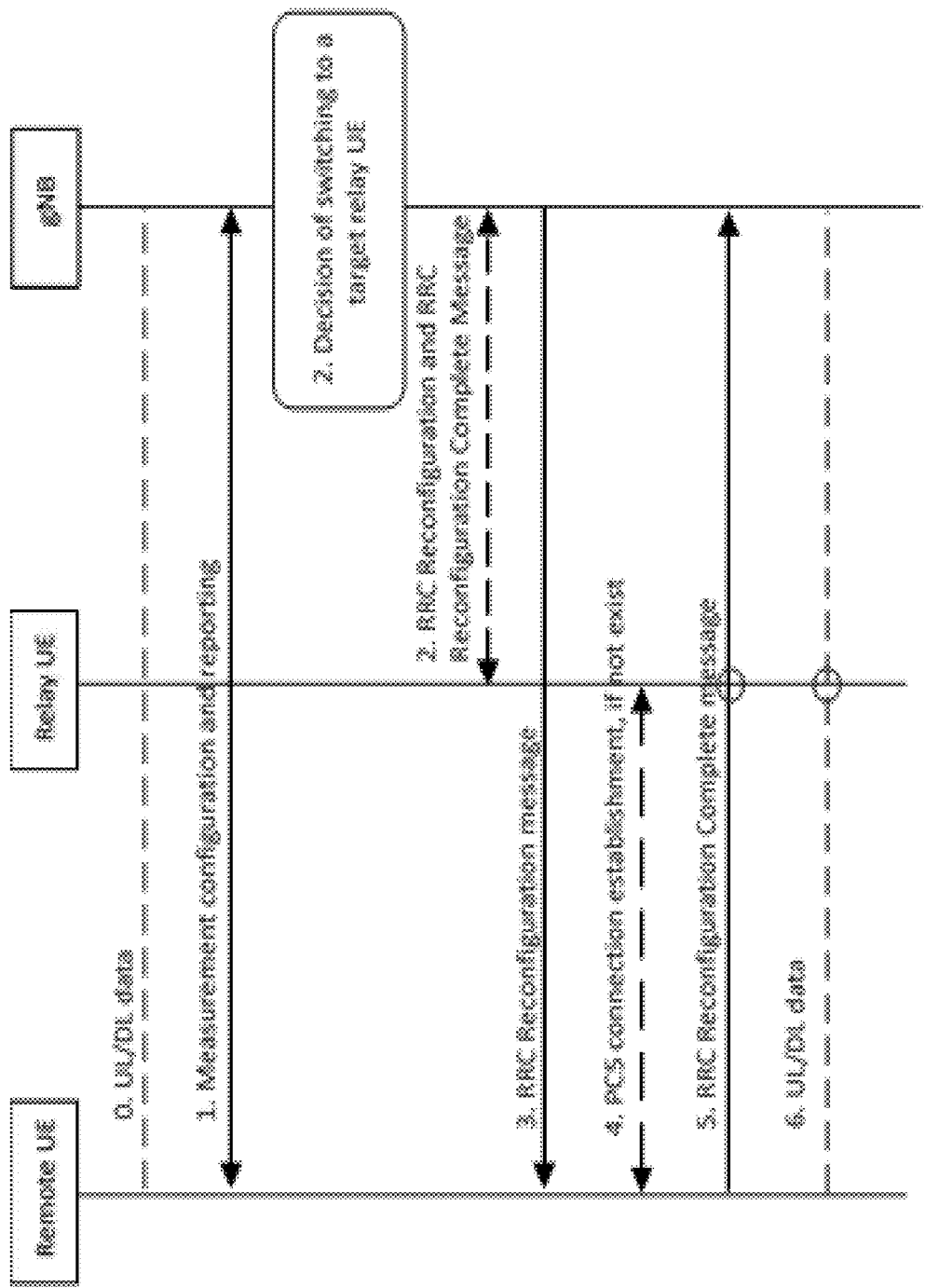
FIG. 17 is a reproduction of FIG. 4.5.4.2-1 of 3GPP TR 38.836 V17.0.0.

For service continuity of L2 UE-to-Network Relay, the following baseline procedure is used, in case of Remote UE switching to indirect Relay UE:

FIG. 4.5.4.2-1 of 3GPP TR 38.836 V17.0.0, Entitled "Procedure for Remote UE Switching to Indirect Relay UE", is Reproduced FIG. 17

Step 1: Remote UE reports one or multiple candidate Relay UE(s), after Remote UE measures/discoveries the candidate Relay UE(s).
 Remote UE may filter the appropriate Relay UE(s) meeting higher layer criteria when reporting, in step 1.
 The reporting may include the Relay UE's ID and SL RSRP information, where the measurement on PC5 details can be left to WI phase, in step 1.

Step 2: Decision of switching to a target Relay UE by gNB, and target (re)configuration is sent to Relay UE optionally (like preparation).
Step 3: RRC Reconfiguration message to Remote UE. Following information may be included: 1) Identity of the target Relay UE; 2) Target Uu and PC5 configuration.
Step 4: Remote UE establishes PC5 connection with target Relay UE, if the connection has not been setup yet.
Step 5: Remote UE feedback the RRCReconfigurationComplete to gNB via target path, using the target configuration provided in RRCReconfiguration.
Step 6: The data path switching.
 NOTE: Following are further discussed in WI phase, including:
  Whether Step 2 should be after Relay UE connects to the gNB (e.g. after step 4), if not yet before;
  Whether Step 4 can be before step 2/3.

4.5.5 Control Plane Procedure
4.5.5.1 Connection Management

Remote UE needs to establish its own PDU sessions/DRBs with the network before user plane data transmission.

PC5-RRC aspects of Rel-16 NR V2X PC5 unicast link establishment procedures can be reused to setup a secure unicast link between Remote UE and Relay UE for L2 UE-to-Network relaying before Remote UE establishes a Uu RRC connection with the network via Relay UE.

For both in-coverage and out-of-coverage cases, when the Remote UE initiates the first RRC message for its connection establishment with gNB, the PC5 L2 configuration for the transmission between the Remote UE and the UE-to-Network Relay UE can be based on the RLC/MAC configuration defined in specifications.

The establishment of Uu SRB1/SRB2 and DRB of the Remote UE is subject to legacy Uu configuration procedures for L2 UE-to-Network Relay.

Figure 18:
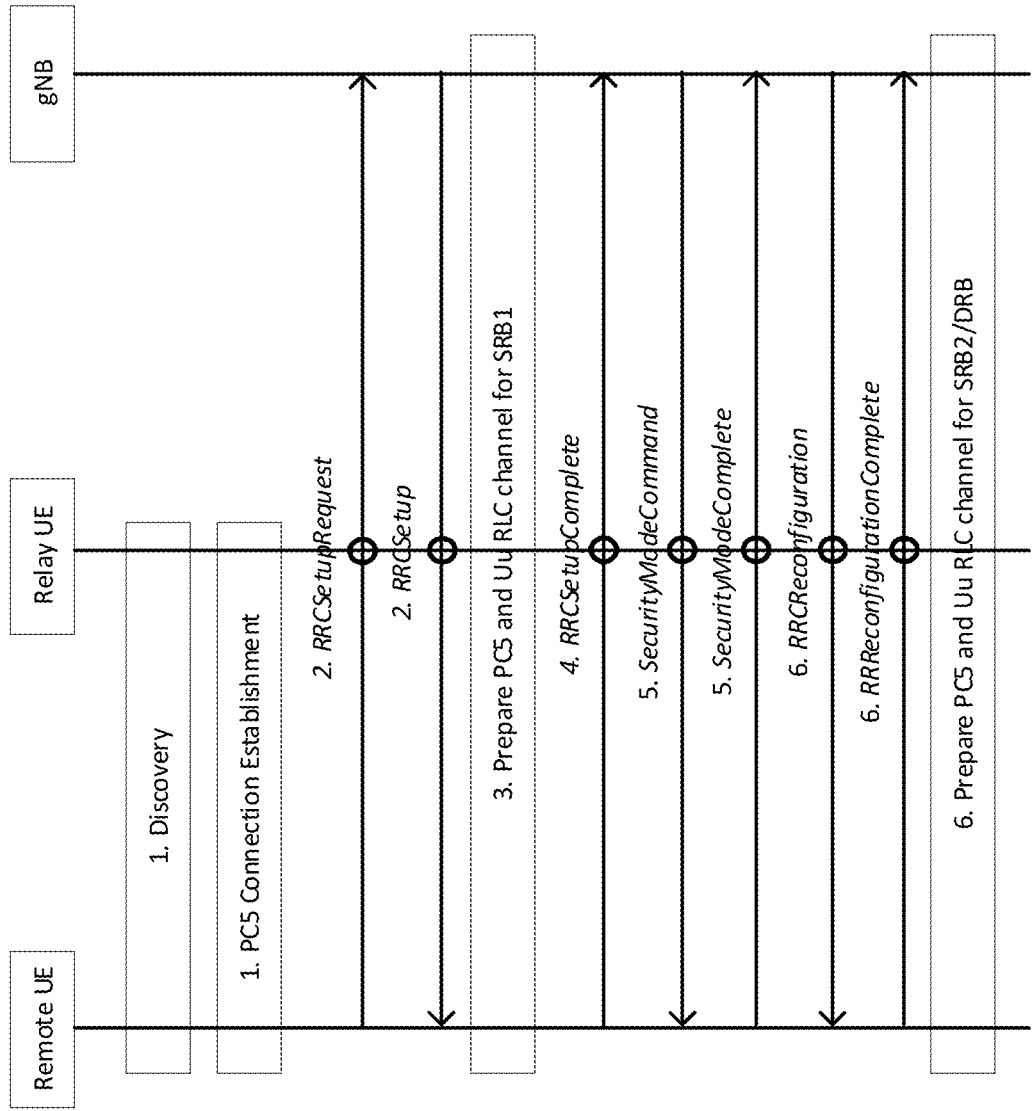
FIG. 18 is a reproduction of FIG. 4.5.5.1-1 of 3GPP TR 38.836 V17.0.0.

The following high level connection establishment procedure applies to L2 UE-to-Network Relay:

FIG. 4.5.5.1-1 of 3GPP TR 38.836 V17.0.0, Entitled "Procedure for Remote UE Connection Establishment", is Reproduced as FIG. 18

Step 1. The Remote and Relay UE perform discovery procedure, and establish PC5-RRC connection using the legacy Rel-16 procedure as a baseline.
Step 2. The Remote UE sends the first RRC message (i.e., RRCSetupRequest) for its connection establishment with gNB via the Relay UE, using a default L2 configuration on PC5. The gNB responds with an RRCSetup message to Remote UE. The RRCSetup delivery to the Remote UE uses the default configuration on PC5. If the Relay UE had not started in RRC_CONNECTED, it would need to do its own connection establishment upon reception of a message on the default L2 configuration on PC5. The details for Relay UE to forward the RRCSetupRequest/RRCSetup message for Remote UE at this step can be discussed in WI phase.
Step 3. The gNB and Relay UE perform relaying channel setup procedure over Uu. According to the configuration from gNB, the Relay/Remote UE establishes an RLC channel for relaying of SRB1 towards the Remote UE over PC5. This step prepares the relaying channel for SRB1.
Step 4. Remote UE SRB1 message (e.g. an RRCSetupComplete message) is sent to the gNB via the Relay UE using SRB1 relaying channel over PC5. Then the Remote UE is RRC connected over Uu.

Step 5. The Remote UE and gNB establish security following legacy procedure and the security messages are forwarded through the Relay UE.

Step 6. The gNB sets up additional RLC channels between the gNB and Relay UE for traffic relaying. According to the configuration from gNB, the Relay/Remote UE sets up additional RLC channels between the Remote UE and Relay UE for traffic relaying. The gNB sends an RRCReconfiguration to the Remote UE via the Relay UE, to set up the relaying SRB2/DRBs. The Remote UE sends an RRCReconfigurationComplete to the gNB via the Relay UE as a response. Besides the connection establishment procedure, for L2 UE-to-Network relay:

- The RRC reconfiguration and RRC connection release procedures can reuse the legacy RRC procedure, with the message content/configuration design left to WI phase.
- The RRC connection re-establishment and RRC connection resume procedures can reuse the legacy RRC procedure as baseline, by considering the above connection establishment procedure of L2 UE-to-Network Relay to handle the relay specific part, with the message content/configuration design left to WI phase.

[ . . . ]

3GPP TS 38.331 specifies signalling radio bearers, paging, Radio Resource Control (RRC) connection establishment, and RRC reconfiguration as follows:

4.2.2 Signalling Radio Bearers

"Signalling Radio Bearers" (SRBs) are defined as Radio Bearers (RBs) that are used only for the transmission of RRC and NAS messages. More specifically, the following SRBs are defined:

- SRB0 is for RRC messages using the CCCH logical channel;
- SRB1 is for RRC messages (which may include a piggybacked NAS message) as well as for NAS messages prior to the establishment of SRB2, all using DCCH logical channel;
- SRB2 is for NAS messages and for RRC messages which include logged measurement information, all using DCCH logical channel. SRB2 has a lower priority than SRB1 and may be configured by the network after AS security activation;
- SRB3 is for specific RRC messages when UE is in (NG)EN-DC or NR-DC, all using DCCH logical channel.

In downlink, piggybacking of NAS messages is used only for one dependent (i.e. with joint success/failure) procedure: bearer establishment/modification/release. In uplink piggybacking of NAS message is used only for transferring the initial NAS message during connection setup and connection resume.

NOTE 1: The NAS messages transferred via SRB2 are also contained in RRC messages, which however do not include any RRC protocol control information.

Once AS security is activated, all RRC messages on SRB1, SRB2 and SRB3, including those containing NAS messages, are integrity protected and ciphered by PDCP. NAS independently applies integrity protection and ciphering to the NAS messages, see TS 24.501 [23]. Split SRB is supported for all the MR-DC options in both SRB1 and SRB2 (split SRB is not supported for SRB0 and SRB3).

For operation with shared spectrum channel access, SRB0, SRB1 and SRB3 are assigned with the highest priority Channel Access Priority Class (CAPC), (i.e. CAPC=1) while CAPC for SRB2 is configurable.

[ . . . ]

5.3.2 Paging
5.3.2.1 General

Figure 19:
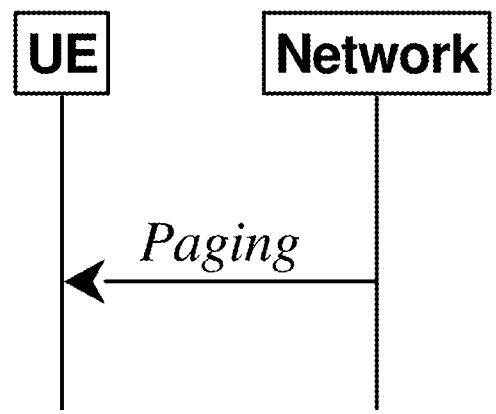
FIG. 19 is a reproduction of FIG. 5.5.1-2 of 3GPP TR 38.836 V1.0.0.

FIG. 5.3.2.1-1 of 3GPP TS 38.331 V16.3.1, Entitled "Paging", is Reproduced as FIG. 19

The purpose of this procedure is:
- to transmit paging information to a UE in RRC_IDLE or RRC_INACTIVE.

5.3.2.2 Initiation

The network initiates the paging procedure by transmitting the Paging message at the UE's paging occasion as specified in TS 38.304 [20]. The network may address multiple UEs within a Paging message by including one PagingRecord for each UE.

5.3.2.3 Reception of the Paging Message by the UE

Upon receiving the Paging message, the UE shall:
1> if in RRC_IDLE, for each of the PagingRecord, if any, included in the Paging message:
  2> if the ue-Identity included in the PagingRecord matches the UE identity allocated by upper layers:
    3> forward the ue-Identity and access Type (if present) to the upper layers;
1> if in RRC_INACTIVE, for each of the PagingRecord, if any, included in the Paging message:
  2> if the ue-Identity included in the PagingRecord matches the UE's stored fullI-RNTI:
    3> if the UE is configured by upper layers with Access Identity 1:
      4> initiate the RRC connection resumption procedure according to 5.3.13 with resumeCause set to mps-PriorityAccess;
    3> else if the UE is configured by upper layers with Access Identity 2:
      4> initiate the RRC connection resumption procedure according to 5.3.13 with resumeCause set to mcs-PriorityAccess;
    3> else if the UE is configured by upper layers with one or more Access Identities equal to 11-15:
      4> initiate the RRC connection resumption procedure according to 5.3.13 with resumeCause set to highPriorityAccess;
    3> else:
      4> initiate the RRC connection resumption procedure according to 5.3.13 with resumeCause set to mt-Access;
  2> else if the ue-Identity included in the PagingRecord matches the UE identity allocated by upper layers:
    3> forward the ue-Identity to upper layers and accessType (if present) to the upper layers;
    3> perform the actions upon going to RRC_IDLE as specified in 5.3.11 with release cause 'other'.

[ . . . ]

5.3.3 RRC Connection Establishment
5.3.3.1 General

Figure 20:
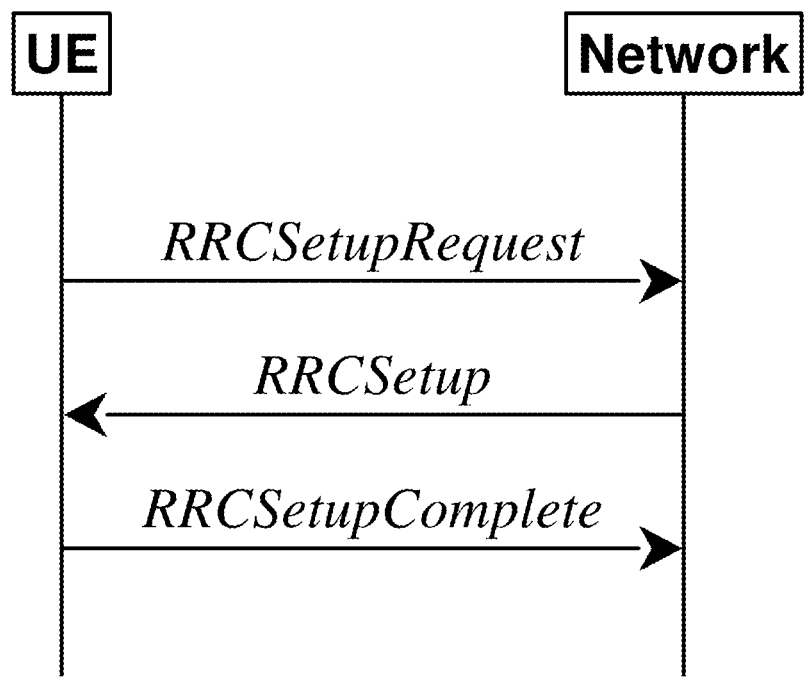
FIG. 20 is a reproduction of FIG. 5.3.3.1-1 of 3GPP TS 38.331 V16.3.1.

FIG. 5.3.3.1-1 of 3GPP TS 38.331 V16.3.1, Entitled "RRC Connection Establishment, Successful", is Reproduced as FIG. 20

Figure 21:
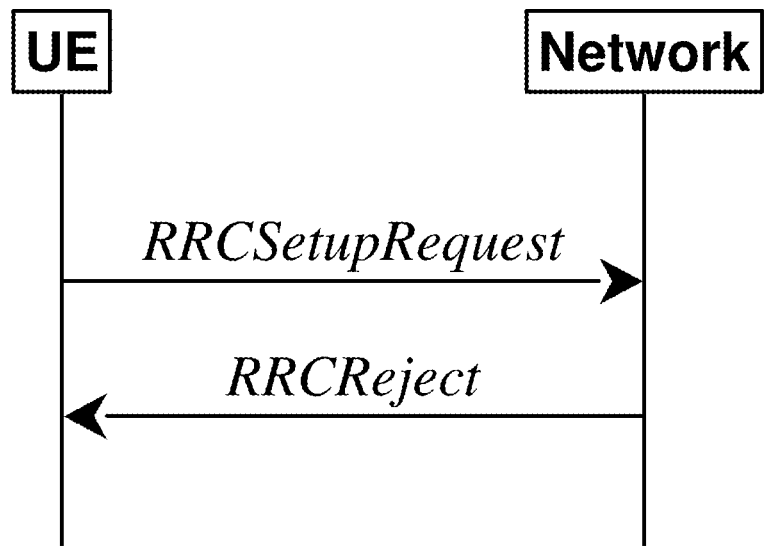
FIG. 21 is a reproduction of FIG. 5.3.3.1-2 of 3GPP TS 38.331 V16.3.1.

FIG. 5.3.3.1-2 of 3GPP TS 38.331 V16.3.1, Entitled "RRC Connection Establishment, Network Reject", is Reproduced as FIG. 21

The purpose of this procedure is to establish an RRC connection. RRC connection establishment involves SRB1 establishment. The procedure is also used to transfer the initial NAS dedicated information/message from the UE to the network.

The network applies the procedure e.g. as follows:
When establishing an RRC connection;
When UE is resuming or re-establishing an RRC connection, and the network is not able to retrieve or verify the UE context. In this case, UE receives RRCSetup and responds with RRCSetupComplete.

[ . . . ]

5.3.5 RRC Reconfiguration
5.3.5.1 General

Figure 22:
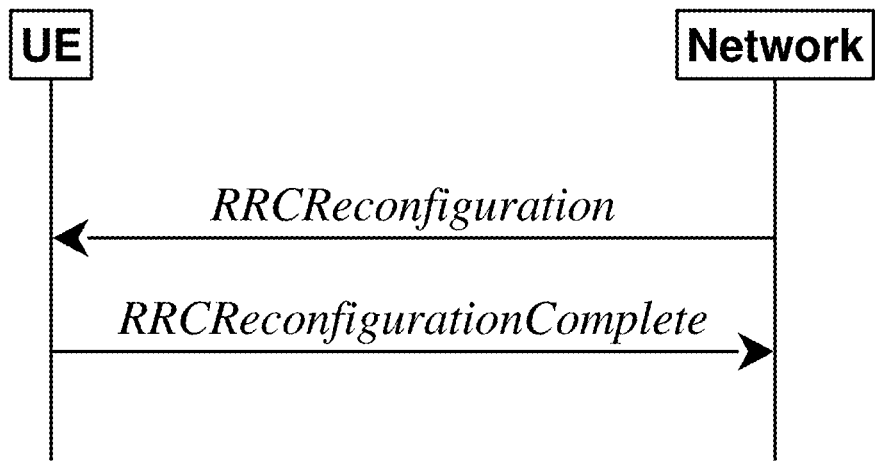
FIG. 22 is a reproduction of FIG. 5.3.5.1-1 of 3GPP TS 38.331 V16.3.1.

FIG. 5.3.5.1-1 of 3GPP TS 38.331 V16.3.1, Entitled "RRC Reconfiguration, Successful", is Reproduced as FIG. 22

[ . . . ]

The purpose of this procedure is to modify an RRC connection, e.g. to establish/modify/release RBs, to perform reconfiguration with sync, to setup/modify/release measurements, to add/modify/release SCells and cell groups, to add/modify/release conditional handover configuration, to add/modify/release conditional PSCell change configuration. As part of the procedure, NAS dedicated information may be transferred from the Network to the UE.

[ . . . ]

5.3.5.2 Initiation
The Network may initiate the RRC reconfiguration procedure to a UE in RRC_CONNECTED. The Network applies the procedure as follows:
 the establishment of RBs (other than SRB1, that is established during RRC connection establishment) is performed only when AS security has been activated;
 the addition of Secondary Cell Group and SCells is performed only when AS security has been activated;
 the reconfigurationWithSync is included in secondaryCellGroup only when at least one RLC bearer is setup in SCG;
 the reconfigurationWithSync is included in masterCellGroup only when AS security has been activated, and SRB2 with at least one DRB or, for IAB, SRB2, are setup and not suspended;
 the conditionalReconfiguration for CPC is included only when at least one RLC bearer is setup in SCG;
 the conditionalReconfiguration for CHO is included only when AS security has been activated, and SRB2 with at least one DRB or, for IAB, SRB2, are setup and not suspended.

[ . . . ]

6.2.2 Message Definitions

[ . . . ]

Paging

The Paging message is used for the notification of one or more UEs.

Paging Message

```
-- ASN1START
-- TAG-PAGING-START
Paging : :=                     SEQUENCE {
    pagingRecordList            PagingRecordList
OPTIONAL, -- Need N
    lateNonCriticalExtension    OCTET STRING
OPTIONAL,
    nonCriticalExtension        SEQUENCE{ }
OPTIONAL
}
PagingRecordList : :=           SEQUENCE (SIZE(1..maxNrofPageRec)) OF PagingRecord
PagingRecord : :=               SEQUENCE {
    ue-Identity                 PagingUE-Identity,
    accessType                  ENUMERATED (non3GPP) OPTIONAL,     -- Need N
    ...
}
PagingUE-Identity : :=          CHOICE {
    ng-5G-S-TMSI                NG-5G-S-TMSI,
    fullI-RNTI                  I-RNTI-Value,
    ...
}
-- TAG-PAGING-STOP
-- ASN1STOP
```

NG-5G-S-TMSI

The IE NG-5G-S-TMSI contains a 5G S-Temporary Mobile Subscription Identifier (5G-S-TMSI), a temporary UE identity provided by the 5GC which uniquely identifies the UE within the tracking area, see TS 23.003 [21].

NG-5G-S-TMSI Information Element

```
-- ASN1START
-- TAG-NG-5G-S-TMSI-START
NG-5G-S-TMSI : :=               BIT STRING (SIZE (48))
-- TAG-NG-5G-S-TMSI-STOP
-- ASN1STOP
```

I-RNTI-Value

The IE I-RNTI-Value is used to identify the suspended UE context of a UE in RRC_INACTIVE.

I-RNTI-Value Information Element

```
-- ASN1START
-- TAG-I-RNTI-VALUE-START
I-RNTI-Value ::=            BIT STRING (SIZE(40))
-- TAG-T-RNTI-VALUE-STOP
-- ASN1STOP
```

9 Specified and Default Radio Configurations

Specified and default configurations are configurations of which the details are specified in the standard. Specified configurations are fixed while default configurations can be modified using dedicated signalling. The default value for the parameters not listed in following subclauses shall be set such as the corresponding features are not configured, i.e. release or false unless explicitly stated otherwise.
  NOTE: The UE applies the default values specified in the field description of ASN.1 parameters only when the parent IE is present. Hence, the UE does not apply all default values in field descriptions when it applies the "default radio configuration" in accordance with this clause.
[ . . . ]
9.2.1 Default SRB Configurations
Parameters

| Name | Value | | | Semantics description | Ver |
| --- | --- | --- | --- | --- | --- |
| | SRB1 | SRB2 | SRB3 | | |
| PDCP-Config | | | | | |
| >t-Reordering | infinity | | | | |
| RLC-Config CHOICE | Am | | | | |
| ul-AM-RLC | | | | | |
| >sn-FieldLength | size12 | | | | |
| >t-PollRetransmit | ms45 | | | | |
| >pollPDU | infinity | | | | |
| >pollByte | infinity | | | | |
| >maxRetxThreshold | t8 | | | | |
| dl-AM-RLC | | | | | |
| >sn-FieldLength | size12 | | | | |
| >t-Reassembly | ms35 | | | | |
| >t-StatusProhibit | ms0 | | | | |
| logicalChannelIdentity | 1 | 2 | 3 | | |
| LogicalChannelConfig | | | | | |
| >priority | 1 | 3 | 1 | | |
| >prioritisedBitRate | infinity | | | | |
| >logicalChannelGroup | 0 | | | | |

Key issue #4 in 3GPP TR 23.752 describes support of UE-to-Network Relay in the following release (i.e. Release 17), which generally means a relay UE will be used to support communication between a remote UE and the network in case the remote UE cannot access the network directly. There are two different types of solutions for UE-to-Network Relay proposed in 3GPP TR 23.752, including a Layer-2 based UE-to-Network Relay and a Layer-3 based UE-to-Network Relay.

As discussed in 3GPP TS 23.304, both Model A discovery and Model B discovery are supported for the remote UE to discover a UE-to-Network Relay. Model A uses a single discovery protocol message (i.e. Discovery Announcement) and Model B uses two discovery protocol messages (i.e. Discovery Solicitation and Discovery Response). In case there are multiple relay UEs in proximity of the remote UE, one of the relay UEs will be selected. After selecting a suitable relay UE, the remote UE will then establish a PC5 RRC connection or PC5 unicast link with the relay UE to support UE-to-Network Relay operation. The UE-to-Network Relay Discovery Announcement message and Discovery Response message transmitted by a relay UE may include a User Info ID of the relay UE and a Relay Service Code (RSC) associated with the connectivity service which the UE-to-Network Relay provides to the Remote UE. The User Info ID and RSC may be provided by a Proximity-based Services (ProSe) application server.

To access a concerned service from a Data Network (DN), a Protocol Data Unit (PDU) session should be established with the DN and the PDU Session Establishment Request message includes a Single Network Slice Selection Assistance Information (S-NSSAI) and a Data Network Name (DNN) associated with the PDU session. In the Layer-2 UE-to-Network Relay solution, the remote UE establishes a PDU session with the network via the relay UE, while the relay UE establishes the PDU session with the network for the remote UE in the Layer-3 UE-to-Network Relay solution.

Section 4.5.4.2 of 3GPP TR 38.836 specifies the procedure for Remote UE switching from direct to indirect communication path in case of Layer-2 based UE-to-Network Relay. In Step 1 of FIG. 4.5.4.2-1 of 3GPP TR 38.836, which is reproduced as FIG. 17, gNB may provide a measurement configuration to the Remote UE and the Remote UE may then transmits a measurement report to gNB. The measurement report may include measurement results of multiple Relay UEs. Each measurement result of a Relay UE may include at least a U2N Relay UE ID, a U2N Relay UE's serving cell ID, and the RSRP information measured over sidelink. In Step 2 of FIG. 4.5.4.2-1 of 3GPP TR 38.836, which is reproduced as FIG. 17, gNB transmits a RRC Reconfiguration message to the Relay UE to indicate the Uu and/or PC5 (or SL) configurations to be applied by the Relay UE for supporting UE-to-Network Relay operation after the path switching. In case the Relay UE is not in RRC CONNECTED mode/state, the gNB needs to page the Relay UE so that the relay UE can connect with the gNB to receive the RRC Reconfiguration message from the gNB.

According to 3GPP TS 38.331, gNB shall page the Relay UE with a UE identity of the Relay UE. The UE identity may be a NG-5G-S-TMSI (48 bits) or a full I-RNTI (40 bits), which is not equal to the User Info ID of the Relay UE included in the UE-to-Network Relay Discovery Announcement message or Discovery Response message and provided by the ProSe application server. One way to let gNB page the Relay UE is to also include the NG-5G-S-TMSI or the full I-RNTI of the Relay UE in the UE-to-Network Relay Discovery message sent by the Relay UE so that the Remote UE can include the NG-5G-S-TMSI or the full I-RNTI of the Relay UE in the measurement report after receiving the UE-to-Network Relay Discovery Announcement message or Discovery Response message from the relay UE. In other words, the U2N Relay UE ID in the measurement report is set to the NG-5G-S-TMSI or the full I-RNTI of the Relay UE. Another way is that the core network may maintain the mappings between User Info IDs and NG-5G-S-TMSIs/full I-RNTIs of relay UEs, allowing gNB to inquire the NG-5G-S-TMSI/full I-RNTI of a Relay UE based on the User Info ID of the Relay UE. In this situation, the U2N Relay UE ID included in the measurement report is set to the User Info ID.

Another potential direction is to avoid the need of gNB paging and reduce the related complexity. For example, the Relay UE may autonomously connect with the gNB after the PC5 RRC connection has been established with the Remote UE. After establishing the RRC connection with the gNB, the relay UE may then transmit a RRC message (e.g. SidelinkUEInformation) to request radio bearer configuration(s) to support UE-to-Network relaying and the gNB may transmit a RRC Reconfiguration message to the relay UE to provide at least a Uu configuration used for forwarding RRC messages (e.g. RRC Reconfiguration Complete) received from the Remote UE to the gNB. The Uu configuration used for forwarding RRC messages (e.g. RRC Reconfiguration Complete) may be associated with an SRB (e.g. SRB1). The RRC Reconfiguration message may also include a PC5 (or SL) configuration used for receiving RRC messages (e.g. RRC Reconfiguration Complete) from the Remote UE. In one embodiment, the Uu configuration may include a Uu Radio Link Control (RLC) bearer configuration. The PC5 (or SL) configuration may include a PC5 (or SL) RLC bearer configuration. In case, the Relay UE has connected with the gNB (i.e. in RRC CONNECTED), there is no need for the Relay to establish the RRC connection with the gNB again. The Relay UE may directly transmit the RRC message (e.g. SidelinkUEInformation) to request the radio bearer configuration(s) to support UE-to-Network relaying.

A precondition of the above solution(s) is that there should be a way for gNB to indicate which Relay UE is selected for path switching after receiving the measurement report from the Remote UE. In one embodiment, the Remote UE may report a list of measurement results of multiple Relay UEs. Each measurement result in the list belongs to a Relay UE. Items of the measurement results in the list can be indexed in sequential order. Each index corresponds to one Relay UE associated with the measurement result in the list. Thus, an index may be used to indicate a Relay UE associated with a measurement result in the list. The indexes may start from 0 or 1.

The table in FIG. 23 (entitled "Table of a list of measurement results") describes an example with indexes starting from 1. In one embodiment, the indexes are not included in the list. In other words, each measurement result is implicitly associated with an index. It is also feasible to include the indexes explicitly in the list.

Therefore, after receiving the measurement report from the Remote UE, the gNB may indicate the Relay UE with an index for path switching in a RRC Reconfiguration message sent to the Remote UE. The RRC Reconfiguration message may indicate the Uu and/or PC5 (or SL) configurations to be used for replying a RRC Reconfiguration Complete message to the gNB via the relay UE and/or the Uu and/or PC5 (or SL) configurations to be applied by the Remote UE for data packet transfer via the relay UE after the path switching. The Remote UE may then establish a PC5 RRC connection (or PC5 unicast link) with the Relay UE indicated by the gNB. After establishment of the PC5 RRC connection (or PC5 unicast link), the Relay UE may then establish a RRC connection with the gNB if the RRC connection has not yet been established. The Relay UE may then transmit a RRC message (e.g. SidelinkUEInformation) to request radio bearer configuration(s) from the gNB to support UE-to-Network relaying as described above.

It is supposed that the RRC Reconfiguration Complete message sent by the Remote UE will be forwarded (or relayed) to the gNB via the Relay UE and the Relay UE will includes information (e.g. a local UE ID of the Remote UE) in an adaptation layer header to identify the Remote UE. In one embodiment, the local UE ID could be assigned by the relay UE or the gNB, and could be unique with the scope of the relay UE. After reception of the RRC Reconfiguration Complete message from the Remote UE, the gNB may then transmit a RRC Reconfiguration message to the Relay UE to further provide the Uu and/or PC5 configurations associated with DRB(s) for packet data transfer.

Figure 24:
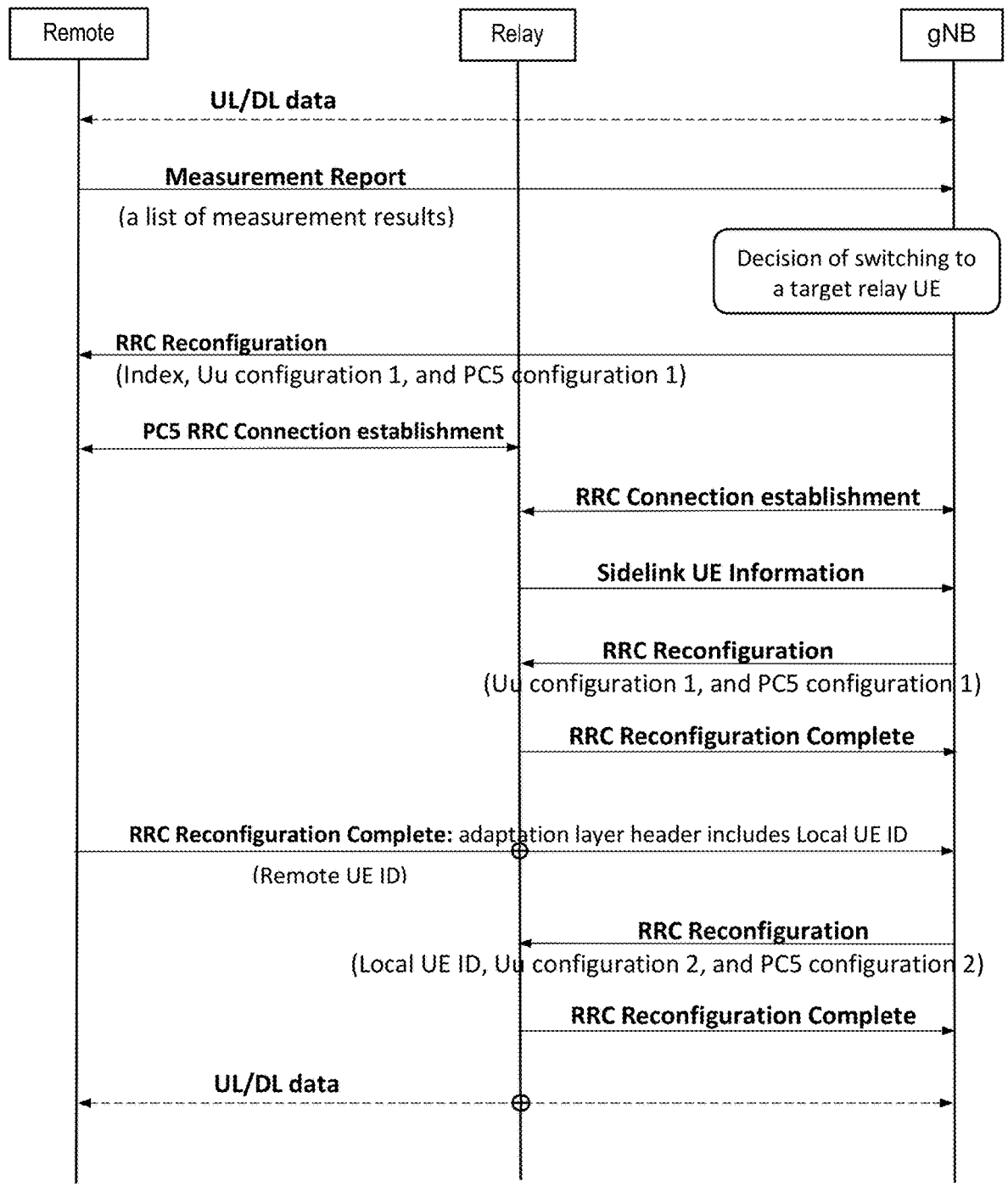
FIG. 24 is a message chart according to one exemplary embodiment.

Considering that there may be multiple Remote UEs connecting with the relay UE for UE-to-Network relaying, the RRC Reconfiguration message may include information (e.g. the local UE ID of a Remote UE) to identify which Remote UE to be associated with the Uu and/or PC5 configurations. Besides, there is a need for the gNB to associate the local UE ID with certain identity of the Remote UE currently maintained in the gNB. To achieve this purpose, the Remote UE may also need to include information in the RRC Reconfiguration Complete message to indicate the Remote UE to the gNB. For example, the information to identify (or indicate) the Remote UE may be a Cell-Radio Network Temporary Identifier (C-RNTI) or an initial UE Identity of the Remote UE. The C-RNTI may be provided by the network node (e.g. in the previous RRC Reconfiguration message) to the remote UE for identifying the remote UE within the network node, and the initial UE Identity of the Remote UE should have been transmitted by the remote UE to the network node in a RRC Setup Request message when establishing a RRC connection with the gNB. The initial UE Identity of the Remote UE may be an ng-5G-S-TMSI-Part1 or a random value defined in a RRC specification (as discussed in 3GPP TS 38.331). FIG. 24 shows an example of the procedure for direct to indirect communication path switching.

It is noted that a RRC Reconfiguration message is used by the gNB to provide radio bearer configuration(s) to a Remote UE or a Relay UE and the Remote UE or the Relay UE may then reply with a RRC Reconfiguration Complete message. Another terms may be used to replace these two RRC messages for the same purpose(s). Besides, it is possible that the gNB which transmits the RRC Reconfiguration message to the Remote UE and the gNB which receives the RRC Reconfiguration Complete message from the Remote UE may be different i.e. the communication path switching is between two different gNBs.

Figure 25:
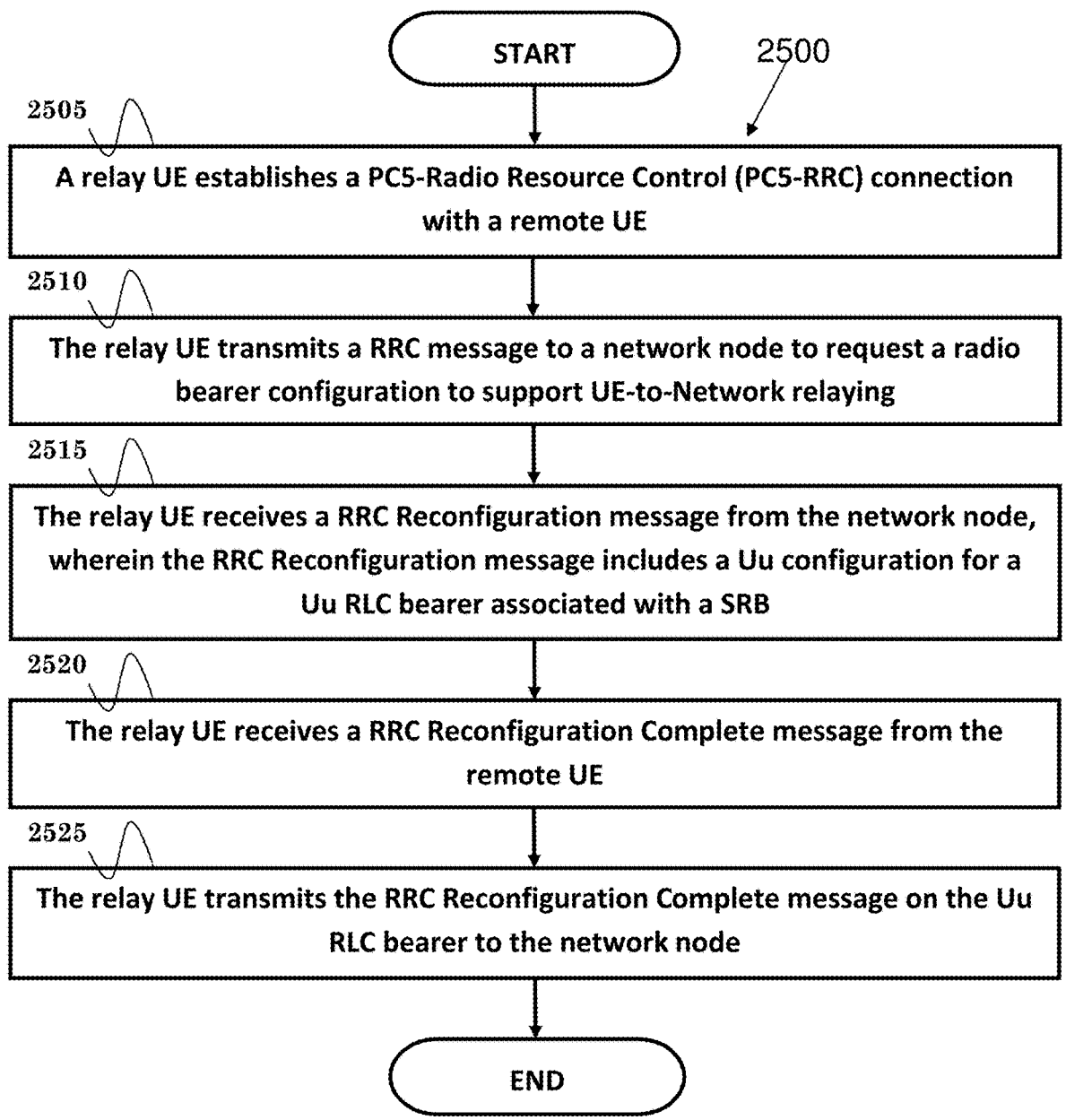
FIG. 25 is a flow chart according to one exemplary embodiment.

FIG. 25 is a flow chart 2500 illustrating a method for radio bearer configuration to support UE-to-Network relaying from the perspective of a relay UE. In step 2505, the relay UE establishes a PC5-Radio Resource Control (PC5-RRC) connection with a remote UE. In step 2510, the relay UE transmits a RRC message to a network node to request a radio bearer configuration to support UE-to-Network relaying. In step 2515, the relay UE receives a RRC Reconfiguration message from the network node, wherein the RRC Reconfiguration message includes a Uu configuration for a Uu Radio Link Control (RLC) bearer associated with a signalling radio bearer (SRB). In step 2520, the relay UE receives a RRC Reconfiguration Complete message from the remote UE. In step 2525, the relay UE transmits the RRC Reconfiguration Complete message on the Uu RLC bearer to the network node.

Referring back to FIGS. 3 and 4, in one exemplary embodiment of a method for a relay UE, the relay UE 300 includes a program code 312 stored in the memory 310. The CPU 308 could execute program code 312 to enable the relay UE (i) to establish a PC5-Radio Resource Control (PC5-RRC) connection with a remote UE, (ii) to transmit a RRC message to a network node to request a radio bearer configuration to support UE-to-Network relaying, (iii) to receive a RRC Reconfiguration message from the network node, wherein the RRC Reconfiguration message includes a Uu configuration for a Uu RLC bearer associated with a SRB, (iv) to receive a RRC Reconfiguration Complete message from the remote UE, and (v) to transmit the RRC Reconfiguration Complete message on the Uu RLC bearer to the network node. Furthermore, the CPU 308 can execute the program code 312 to perform all of the above-described actions and steps or others described herein.

Figure 26:
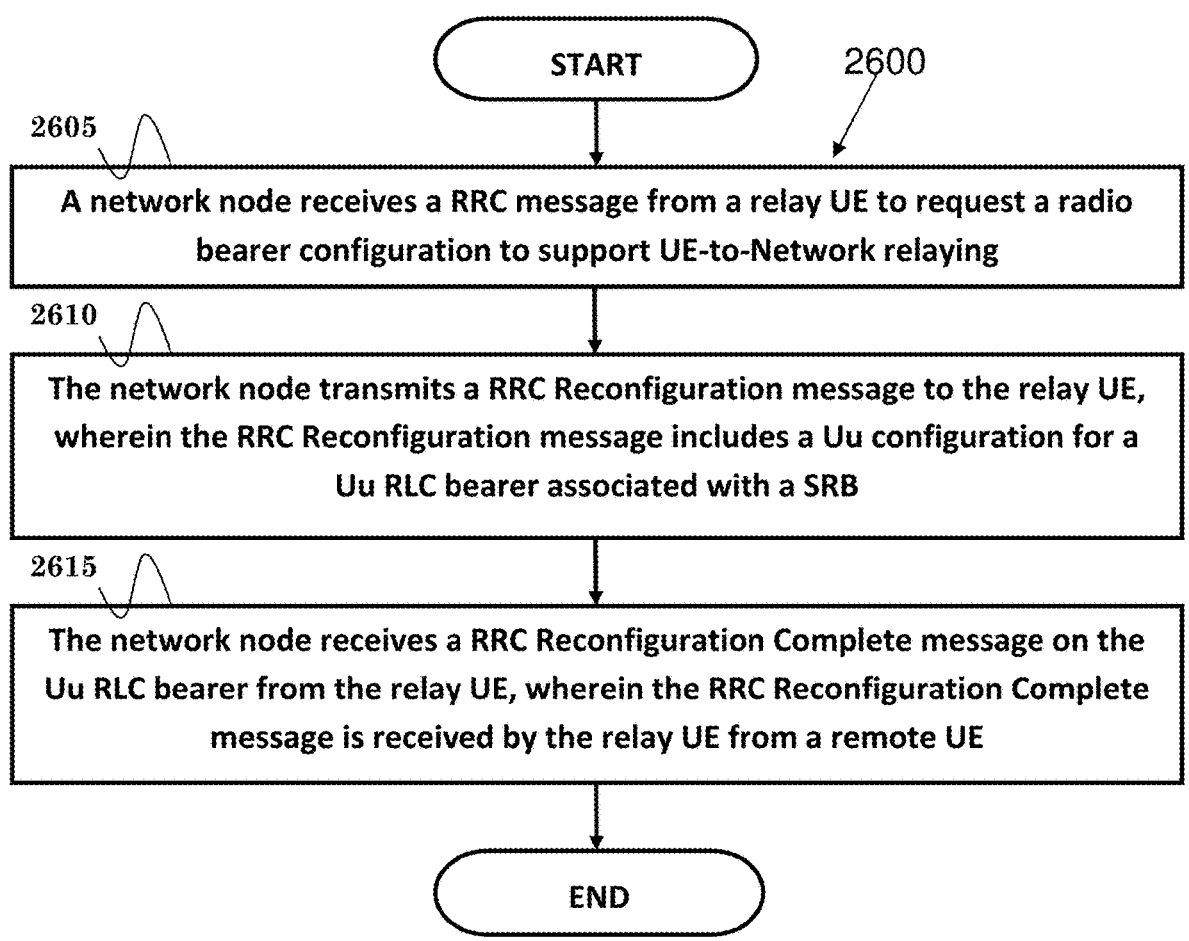
FIG. 26 is a flow chart according to one exemplary embodiment.

FIG. 26 is a flow chart 2600 illustrating a method for radio bearer configuration to support UE-to-Network relaying from the perspective of a network node. In step 2605, the network node receives a RRC message from a relay UE to request a radio bearer configuration to support UE-to-Network relaying. In step 2610, the network node transmits a RRC Reconfiguration message to the relay UE, wherein the RRC Reconfiguration message includes a Uu configuration for a Uu RLC bearer associated with a SRB. In step 2615, the network node receives a RRC Reconfiguration Complete message on the Uu RLC bearer from the relay UE, wherein the RRC Reconfiguration Complete message is received by the relay UE from a remote UE.

Referring back to FIGS. 3 and 4, in one exemplary embodiment of a method for a network node, the network node 300 includes a program code 312 stored in the memory 310. The CPU 308 could execute program code 312 to enable the network node (i) to receive a RRC message from a relay UE to request a radio bearer configuration to support UE-to-Network relaying, (ii) to transmit a RRC Reconfiguration message to the relay UE, wherein the RRC Reconfiguration message includes a Uu configuration for a Uu RLC bearer associated with a SRB, and (iii) to receive a RRC Reconfiguration Complete message on the Uu RLC bearer from the relay UE, wherein the RRC Reconfiguration Complete message is received by the relay UE from a remote UE. Furthermore, the CPU 308 can execute the program code 312 to perform all of the above-described actions and steps or others described herein.

In the context of the embodiments illustrated in FIGS. 25 and 26 and discussed above, in one embodiment, the RRC Reconfiguration message may include a Sidelink (SL) configuration for a SL RLC bearer associated with the SRB. The RRC Reconfiguration Complete message could be received by the relay UE on the SL RLC bearer from the remote UE. The RRC Reconfiguration message may include a local UE Identity (ID) of the remote UE.

In one embodiment, the RRC message could be transmitted by the relay UE after a RRC connection is established between the relay UE and the network node. The SRB could be SRB1.

In one embodiment, the RRC Reconfiguration Complete message could be included in an adaptation layer PDU by the relay UE, and a header of the adaptation layer PDU may include a local UE ID of the remote UE.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for radio bearer configuration to support User Equipment-to-Network (UE-to-Network) relaying, comprising:
a relay UE establishes a PC5-Radio Resource Control (PC5-RRC) connection with a remote UE;
the relay UE transmits a RRC message to a network node to request a radio bearer configuration to support UE-to-Network relaying;
the relay UE receives a RRC Reconfiguration message from the network node, wherein the RRC Reconfiguration message includes a Uu configuration for a Uu Radio Link Control (RLC) bearer associated with a signalling radio bearer (SRB);
the relay UE receives a RRC Reconfiguration Complete message from the remote UE; and
the relay UE transmits the RRC Reconfiguration Complete message on the Uu RLC bearer to the network node.

2. The method of claim 1, wherein the RRC Reconfiguration message includes a Sidelink (SL) configuration for a SL RLC bearer associated with the SRB.

3. The method of claim 2, wherein the RRC Reconfiguration Complete message is received by the relay UE on the SL RLC bearer from the remote UE.

4. The method of claim 1, wherein the RRC Reconfiguration message includes a local UE Identity (ID) of the remote UE.

5. The method of claim 1, wherein the RRC message is transmitted by the relay UE after a RRC connection is established between the relay UE and the network node.

6. The method of claim 1, wherein the SRB is SRB1.

7. The method of claim 1, wherein the RRC Reconfiguration Complete message is included in an adaptation layer Protocol Data Unit (PDU) by the relay UE and wherein a header of the adaptation layer PDU includes a local UE Identity (ID) of the remote UE.

8. A method for radio bearer configuration to support User Equipment-to-Network (UE-to-Network) relaying, comprising:
a network node receives a Radio Resource Control (RRC) message from a relay UE to request a radio bearer configuration to support UE-to-Network relaying;
the network node transmits a RRC Reconfiguration message to the relay UE, wherein the RRC Reconfiguration message includes a Uu configuration for a Uu Radio Link Control (RLC) bearer associated with a signalling radio bearer (SRB); and
the network node receives a RRC Reconfiguration Complete message on the Uu RLC bearer from the relay UE, wherein the RRC Reconfiguration Complete message is received by the relay UE from a remote UE.

9. The method of claim 8, wherein the RRC Reconfiguration message includes a Sidelink (SL) configuration for a SL RLC bearer associated with the SRB.

10. The method of claim 9, wherein the RRC Reconfiguration Complete message is received by the relay UE on the SL RLC bearer from the remote UE.

11. The method of claim 8, wherein the RRC Reconfiguration message includes a local UE Identity (ID) of the remote UE.

12. The method of claim 8, wherein the RRC message is transmitted by the relay UE after a RRC connection is established between the relay UE and the network node.

13. The method of claim 8, wherein the SRB is SRB1.

14. The method of claim 8, wherein the RRC Reconfiguration Complete message is included in an adaptation layer Protocol Data Unit (PDU) by the relay UE and wherein a header of the adaptation layer PDU includes a local UE Identity (ID) of the remote UE.

15. A relay User Equipment (UE), comprising:
a control circuit;
a processor installed in the control circuit; and
a memory installed in the control circuit and operatively coupled to the processor;
wherein the processor is configured to execute a program code stored in the memory to:
establish a PC5-Radio Resource Control (PC5-RRC) connection with a remote UE;
transmit a RRC message to a network node to request a radio bearer configuration to support UE-to-Network relaying;
receive a RRC Reconfiguration message from the network node, wherein the RRC Reconfiguration message includes a Uu configuration for a Uu Radio Link Control (RLC) bearer associated with a signalling radio bearer (SRB);
receive a RRC Reconfiguration Complete message from the remote UE; and
transmit the RRC Reconfiguration Complete message on the Uu RLC bearer to the network node.

16. The relay UE of claim 15, wherein the RRC Reconfiguration message includes a Sidelink (SL) configuration for a SL RLC bearer associated with the SRB.

17. The relay UE of claim 16, wherein the RRC Reconfiguration Complete message is received by the relay UE on the SL RLC bearer from the remote UE.

18. The relay UE of claim 15, wherein the RRC Reconfiguration message includes a local UE Identity (ID) of the remote UE.

19. The relay UE of claim 15, wherein the RRC message is transmitted by the relay UE after a RRC connection is established between the relay UE and the network node.

20. The relay UE of claim 15, wherein the RRC Reconfiguration Complete message is included in an adaptation layer Protocol Data Unit (PDU) by the relay UE and wherein a header of the adaptation layer PDU includes a local UE Identity (ID) of the remote UE.

* * * * *